(12) United States Patent
Araki et al.

(10) Patent No.: US 8,270,110 B2
(45) Date of Patent: Sep. 18, 2012

(54) MAGNETIC HEAD FOR PERPENDICULAR MAGNETIC RECORDING HAVING SIDE SHIELD LAYER AND METHOD OF MANUFACTURING SAME

(75) Inventors: Hironori Araki, Milpitas, CA (US);
Yoshitaka Sasaki, Milpitas, CA (US);
Hiroyuki Ito, Milpitas, CA (US);
Shigeki Tanemura, Milpitas, CA (US);
Kazuo Ishizaki, Milpitas, CA (US);
Takehiro Horinaka, Milpitas, CA (US)

(73) Assignee: Headway Technologies, Inc., Milipitas, CA (US)

( * ) Notice: Subject to any disclaimer, the term of this patent is extended or adjusted under 35 U.S.C. 154(b) by 668 days.

(21) Appl. No.: 12/318,412

(22) Filed: Dec. 29, 2008

(65) Prior Publication Data

US 2010/0165517 A1 Jul. 1, 2010

(51) Int. Cl.
*G11B 5/127* (2006.01)

(52) U.S. Cl. ................... 360/125.11; 29/603.16

(58) Field of Classification Search .................. None
See application file for complete search history.

(56) References Cited

U.S. PATENT DOCUMENTS

| 7,796,361 | B2 | 9/2010 | Sasaki et al. |
| 7,843,665 | B2 | 11/2010 | Sasaki et al. |
| 2005/0219743 | A1 | 10/2005 | Guan et al. |
| 2005/0219747 | A1* | 10/2005 | Hsu et al. ................ 360/126 |
| 2007/0177301 | A1* | 8/2007 | Han et al. ................ 360/126 |
| 2007/0291409 | A1* | 12/2007 | Sasaki et al. .............. 360/126 |

FOREIGN PATENT DOCUMENTS

| JP | A-2005-302281 | 10/2005 |
| JP | A-2008-71469 | 3/2008 |
| JP | A-2008-243350 | 10/2008 |

OTHER PUBLICATIONS

Japanese Office Action dated Feb. 15, 2012 (mailed Feb. 17, 2012) for Japanese Patent Application No. 2009-156550 (with translation).

\* cited by examiner

*Primary Examiner* — Holly Rickman
*Assistant Examiner* — Lisa Chau
(74) *Attorney, Agent, or Firm* — Oliff & Berridge PLC

(57) ABSTRACT

A magnetic head includes a side shield layer and an encasing layer. The side shield layer has a first end face located in the medium facing surface, a second end face opposite to the first end face, and a first groove accommodating a portion of a pole layer. The first end face includes two portions located on both sides of an end face of the pole layer that are opposite to each other in a track width direction. The encasing layer is formed of a nonmagnetic material and disposed on a side of the side shield layer opposite to a medium facing surface. The encasing layer has a front end face touching the second end face of the side shield layer, and a second groove accommodating another portion of the pole layer. The distance from the medium facing surface to an arbitrary point on the second end face of the side shield layer decreases with decreasing distance from the arbitrary point to the top surface of a substrate.

8 Claims, 19 Drawing Sheets

MAGNETIC HEAD FOR PERPENDICULAR MAGNETIC RECORDING HAVING SIDE SHIELD LAYER AND METHOD OF MANUFACTURING SAME

BACKGROUND OF THE INVENTION

1. Field of the Invention

The present invention relates to a magnetic head for perpendicular magnetic recording that is used for writing data on a recording medium by means of a perpendicular magnetic recording system, and to a method of manufacturing such a magnetic head.

2. Description of the Related Art

The recording systems of magnetic read/write apparatuses include a longitudinal magnetic recording system wherein signals are magnetized in a direction along the plane of the recording medium (the longitudinal direction) and a perpendicular magnetic recording system wherein signals are magnetized in a direction perpendicular to the plane of the recording medium. It is known that the perpendicular magnetic recording system is harder to be affected by thermal fluctuation of the recording medium and capable of providing higher linear recording density, compared with the longitudinal magnetic recording system.

Typically, magnetic heads for perpendicular magnetic recording have a structure in which a read head having a magnetoresistive element (hereinafter, also referred to an MR element) for reading and a write head having an induction-type electromagnetic transducer for writing are stacked on a substrate, as is the case with magnetic heads for longitudinal magnetic recording. The write head includes a pole layer that produces a magnetic field in the direction perpendicular to the plane of the recording medium. The pole layer includes, for example, a track width defining portion having an end located in a medium facing surface that faces toward the recording medium, and a wide portion that is coupled to the other end of the track width defining portion and that is greater in width than the track width defining portion. The track width defining portion has a nearly uniform width. To achieve a higher recording density, a reduction in track width and an improvement in write characteristics, such as an overwrite property that is a parameter indicating an overwriting capability, are required of a write head of the perpendicular magnetic recording system.

As a magnetic head for perpendicular magnetic recording, there is known a magnetic head including a shield, the shield having an end face located in the medium facing surface at a position forward of the end face of the pole layer along the direction of travel of the recording medium with a predetermined distance provided therebetween, as disclosed in U.S. Patent Application Publication No. 2005/0219747 A1, for example. A gap layer made of a nonmagnetic material is provided between the pole layer and the shield. The shield has a function of preventing a magnetic flux from reaching the recording medium, the flux being generated from the end face of the pole layer and expanding in directions except the direction perpendicular to the plane of the recording medium. A magnetic head including such a shield enables a further improvement in recording density.

A magnetic head for use in a magnetic disk drive such as a hard disk drive is typically provided in a slider. The slider has the medium facing surface mentioned above. The medium facing surface has an air-inflow-side end and an air-outflow-side end. The slider is designed to slightly fly over the surface of the recording medium by means of an airflow that comes from the air-inflow-side end into the space between the medium facing surface and the recording medium. The magnetic head is typically disposed near the air-outflow-side end of the medium facing surface of the slider. In a magnetic disk drive, the magnetic head is aligned through the use of a rotary actuator, for example. In this case, the magnetic head moves over the recording medium along a circular orbit centered on the center of rotation of the rotary actuator. In such, a magnetic disk drive, a tilt of the magnetic head with respect to the tangent of the circular track, which is called a skew, occurs in accordance with the position of the magnetic head across the tracks.

In a magnetic disk drive of the perpendicular magnetic recording system, in particular, which exhibits a better capability of writing on a recording medium compared with the longitudinal magnetic recording system, the skew mentioned above often causes a phenomenon in which, when data is written on a certain track, data stored on a track adjacent thereto is erased (this phenomenon is hereinafter called adjacent track erasing). To achieve a higher recording density, it is required to suppress the adjacent track erasing.

As a technique for preventing the adjacent track erasing resulting from the skew mentioned above, it is effective to form a tapered surface in the top surface of the pole layer near the medium facing surface such that the thickness of the pole layer near the medium facing surface decreases with decreasing distance from the medium facing surface, as disclosed in U.S. Patent Application Publication No. 2005/0219747 A1. This technique allows a reduction in thickness of the track width defining portion in the medium facing surface, thereby making it possible to suppress the adjacent track erasing resulting from the skew. This technique also allows guiding a magnetic flux of great magnitude to the medium facing surface through the pole layer, thereby making it possible to suppress degradation of the write characteristics (overwrite property).

As a technique for preventing the adjacent track erasing in a write head of the perpendicular magnetic recording system, providing a side shield layer as disclosed in U.S. Patent Application Publication No. 2007/0177301 A1 is also effective.

In a magnetic head for perpendicular magnetic recording, flux leakage from the pole layer to the outside is likely to occur in a location near the boundary between the track width defining portion and the wide portion of the pole layer where the width of the pole layer abruptly changes. When providing a side shield layer in such a magnetic head, the side shield layer is to be disposed near the boundary between the track width defining portion and the wide portion where flux leakage is likely to occur. This can result in a problem that a magnetic flux leaks from the pole layer to the side shield layer to cause degradation of the write characteristics (overwrite property).

OBJECT AND SUMMARY OF THE INVENTION

It is an object of the present invention to provide a magnetic head for perpendicular magnetic recording that is capable of suppressing the occurrence of adjacent track erasing and attaining improved write characteristics, and to provide a method of manufacturing such a magnetic head.

A magnetic head for perpendicular magnetic recording according to the present invention includes: a medium facing surface that faces toward a recording medium; a coil for generating a magnetic field corresponding to data to be written on the recording medium; a pole layer having an end face located in the medium facing surface, the pole layer allowing a magnetic flux corresponding to the magnetic field generated by the coil to pass and generating a write magnetic field for writing the data on the recording medium by means of a perpendicular magnetic recording system; a top shield layer formed of a magnetic material and having an end face located in the medium facing surface at a position forward of the end face of the pole layer along a direction of travel of the recording medium; a top gap layer formed of a nonmagnetic material and having an end face located in the medium facing surface, the top gap layer being disposed between the pole layer and the top shield layer; a side shield layer formed of a magnetic material, the side shield layer having a first end face located in the medium facing surface, a second end face opposite to the first end face, and a first groove accommodating a portion of the pole layer, the first end face including two portions located on both sides of the end face of the pole layer that are opposite to each other in the track width direction; a side gap layer formed of a nonmagnetic material and having an end face located in the medium facing surface, the side gap layer being disposed between the pole layer and the side shield layer; an encasing layer formed of a nonmagnetic material and disposed on a side of the side shield layer opposite to the medium facing surface, the encasing layer having a front end face touching the second end face of the side shield layer, and a second groove accommodating another portion of the pole layer; and a substrate on which the coil, the side shield layer, the side gap layer, the encasing layer, the pole layer, the top gap layer and the top shield layer are stacked, the substrate having a top surface.

In the magnetic head according to the present invention, the pole layer is located closer to the top surface of the substrate than is the top shield layer. The distance from the medium facing surface to an arbitrary point on the second end face of the side shield layer decreases with decreasing distance from the arbitrary point to the top surface of the substrate.

In the magnetic head according to the present invention, the end face of the pole layer located in the medium facing surface may have a width that is taken in the track width direction and that decreases with decreasing distance from the top surface of the substrate. In this case, the portion of the pole layer accommodated in the first groove of the side shield layer may have a first side surface and a second side surface that are opposite to each other in the track width direction, while the portion of the pole layer accommodated in the second groove of the encasing layer may have a third side surface and a fourth side surface that are opposite to each other in the track width direction. The distance between the first side surface and the second side surface taken in the track width direction may decrease with decreasing distance from the top surface of the substrate. An angle formed by each of the third and fourth side surfaces with respect to the direction perpendicular to the top surface of the substrate may be smaller than an angle formed by each of the first and second side surfaces with respect to the direction perpendicular to the top surface of the substrate.

In the magnetic head according to the present invention, the pole layer may have a top surface including a first portion and a second portion, the first portion having a first edge located in the medium facing surface and a second edge opposite to the first edge, the second portion being located farther from the medium facing surface than is the first portion and being connected to the first portion at the second edge. The distance from the top surface of the substrate to an arbitrary point on the first portion may decrease with decreasing distance from the arbitrary point to the medium facing surface.

A method of manufacturing the magnetic head for perpendicular magnetic recording according to the present invention includes the steps of: forming a nonmagnetic layer, the nonmagnetic layer being intended to become the encasing layer by undergoing formation of the front end face and the second groove therein later; forming an etching mask layer on a top surface of the nonmagnetic layer, the etching mask layer being intended to be used when the nonmagnetic layer is etched for forming the front end face of the encasing layer; forming the front end face in the nonmagnetic layer by selectively etching the nonmagnetic layer using the etching mask layer; forming the side shield layer; forming the second groove in the nonmagnetic layer by selectively etching the nonmagnetic layer and the etching mask layer so that the nonmagnetic layer becomes the encasing layer; forming the side gap layer in the first groove of the side shield layer; forming a magnetic layer after the formation of the side gap layer, the magnetic layer being intended to later become the pole layer and being formed to fill the first and second grooves and to have a top surface located higher than a top surface of each of the side shield layer and the etching mask layer; forming the pole layer by processing the magnetic layer; forming the top gap layer; forming the top shield layer; and forming the coil.

In the method of manufacturing the magnetic head according to the present invention, the step of forming the pole layer includes the step of polishing the magnetic layer so as to flatten the top surfaces of the magnetic layer, the side shield layer and the etching mask layer and to form at least the portion of the pole layer accommodated in the second groove of the encasing layer.

In the method of manufacturing the magnetic head according to the present invention, the end face of the pole layer located in the medium facing surface may have a width that is taken in the track width direction and that decreases with decreasing distance from the top surface of the substrate. In this case, the portion of the pole layer accommodated in the first groove of the side shield layer may have a first side surface and a second side surface that are opposite to each other in the track width direction, while the portion of the pole layer accommodated in the second groove of the encasing layer may have a third side surface and a fourth side surface that are opposite to each other in the track width direction. The distance between the first side surface and the second side surface taken in the track width direction may decrease with decreasing distance from the top surface of the substrate. An angle formed by each of the third and fourth side surfaces with respect to the direction perpendicular to the top surface of the substrate may be smaller than an angle formed by each of the first and second side surfaces with respect to the direction perpendicular to the top surface of the substrate.

In the method of manufacturing the magnetic head according to the present invention, the pole layer may have a top surface including a first portion and a second portion, the first portion having a first edge located in the medium facing surface and a second edge opposite to the first edge, the second portion being located farther from the medium facing surface than is the first portion and being connected to the first portion at the second edge. The distance from the top surface of the substrate to an arbitrary point on the first portion may decrease with decreasing distance from the arbitrary point to the medium facing surface. In this case, the method of manufacturing the magnetic head may further include the step of etching a portion of the magnetic layer so as to form the first portion of the top surface of the pole layer, the step of etching being performed between the step of polishing the magnetic layer and the step of forming the top gap layer.

According to the magnetic head for perpendicular magnetic recording or the method of manufacturing the same of the present invention, the presence of the side shield layer allows suppression of the occurrence of adjacent track erasing. According to the present invention, the distance from the medium facing surface to an arbitrary point on the second end face of the side shield layer decreases with decreasing distance from the arbitrary point to the top surface of the substrate. Consequently, the distance between the pole layer and an arbitrary point on the second end face of the side shield layer increases with decreasing distance from the arbitrary point to the top surface of the substrate. According to the present invention, this makes it possible to suppress the flux leakage from the pole layer to the side shield layer. From the foregoing, the present invention makes it possible to suppress the occurrence of adjacent track erasing and to attain improved write characteristics.

Other objects, features and advantages of the present invention will become fully apparent from the following description.

DETAILED DESCRIPTION OF THE PREFERRED EMBODIMENT

Figure 1:
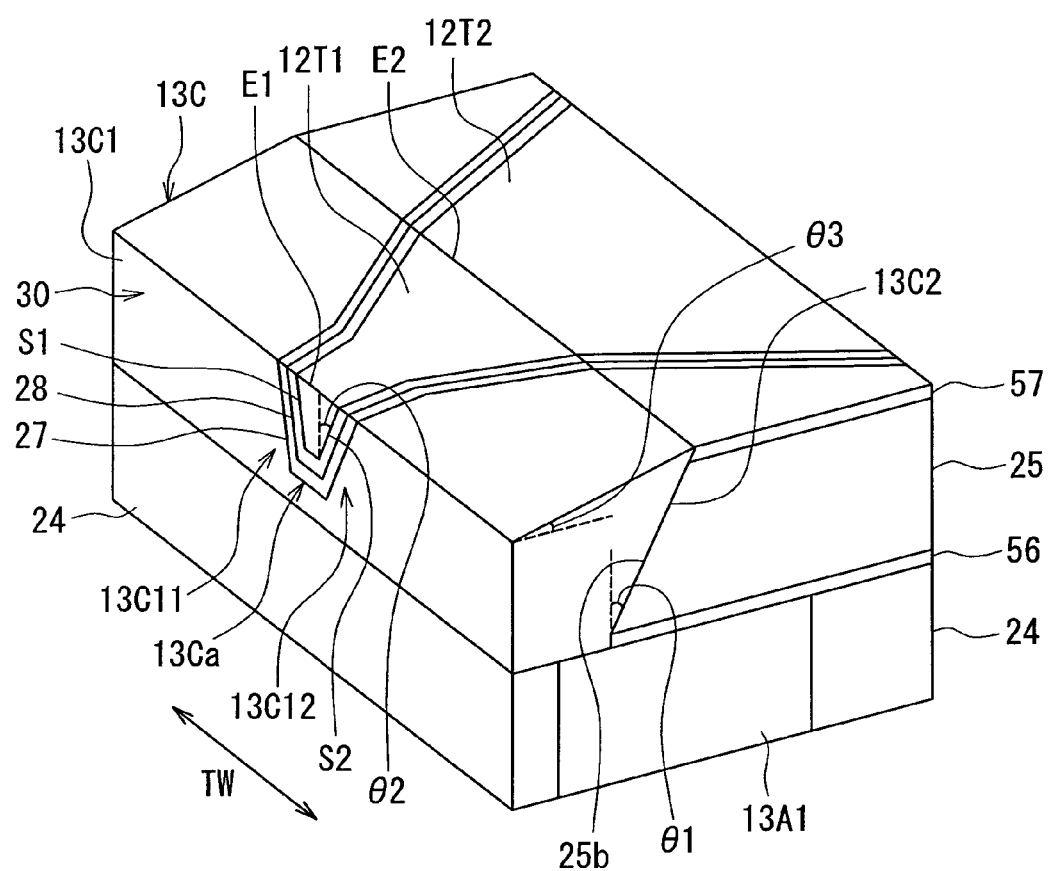
FIG. 1 is a perspective view showing respective portions of a pole layer and a side shield layer in the neighborhood of the medium facing surface of a magnetic head according to an embodiment of the invention.
Figure 2:
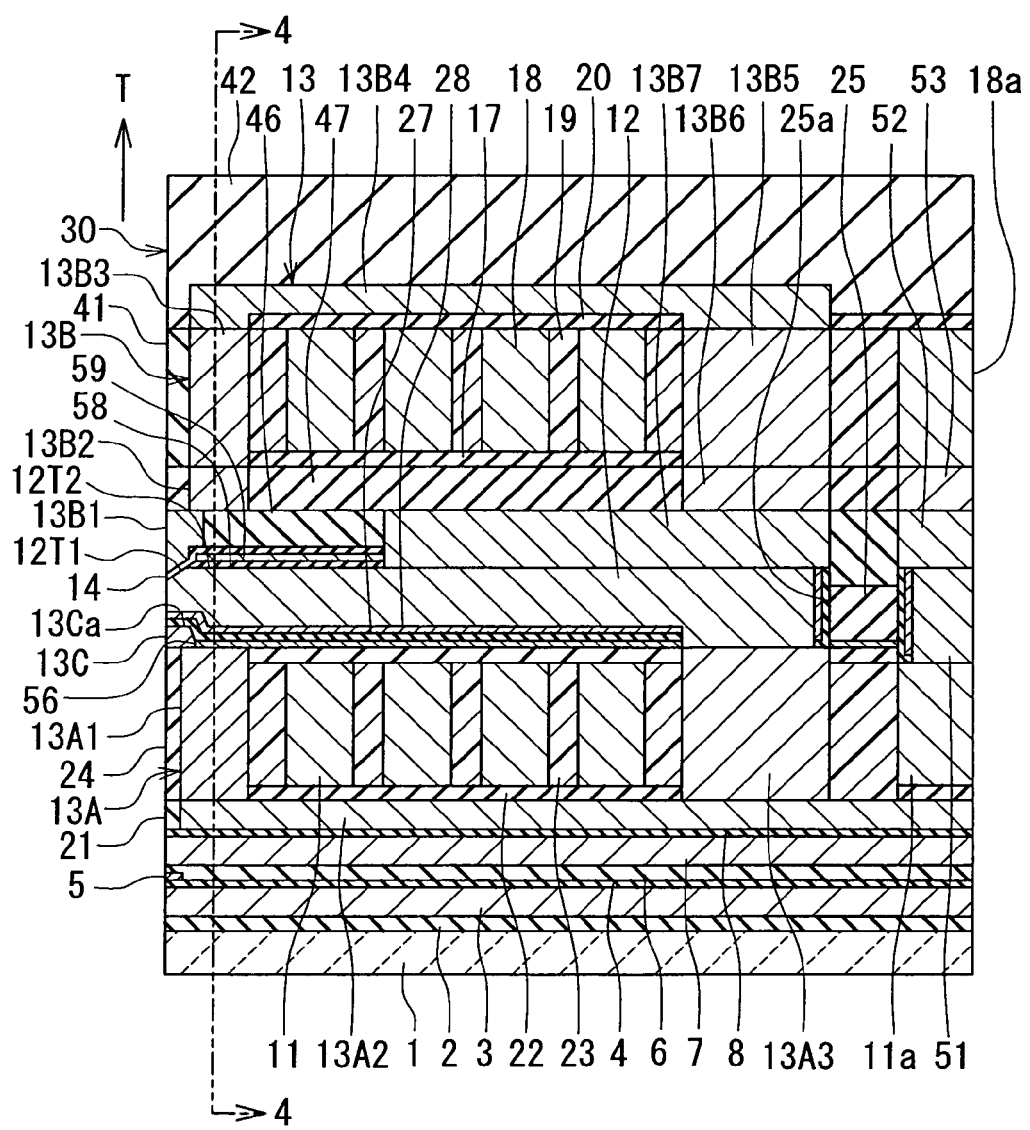
FIG. 2 is a cross-sectional view showing the configuration of the magnetic head according to the embodiment of the invention.
Figure 3:
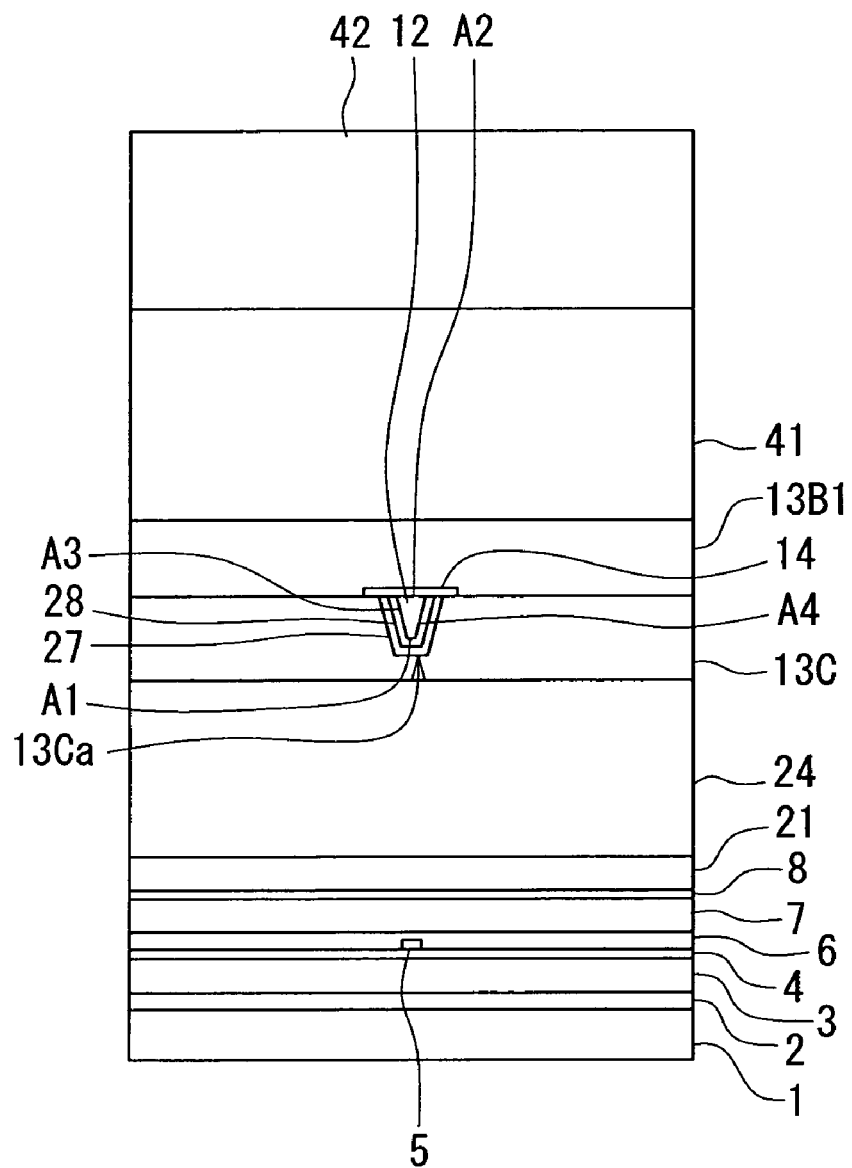
FIG. 3 is a front view showing the medium facing surface of the magnetic head according to the embodiment of the invention.
Figure 4:
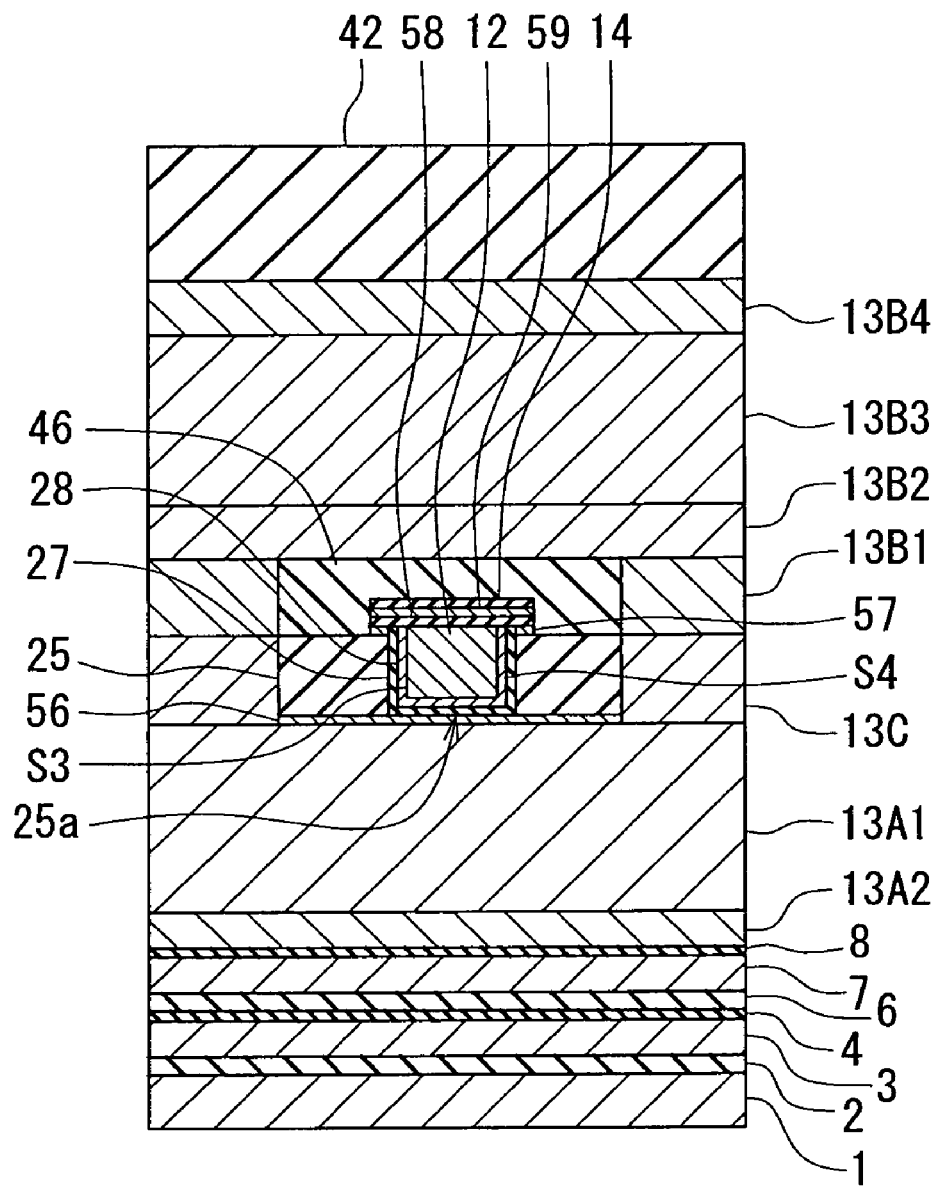
FIG. 4 is a cross-sectional view taken along line 4-4 of FIG. 2.
Figure 5:
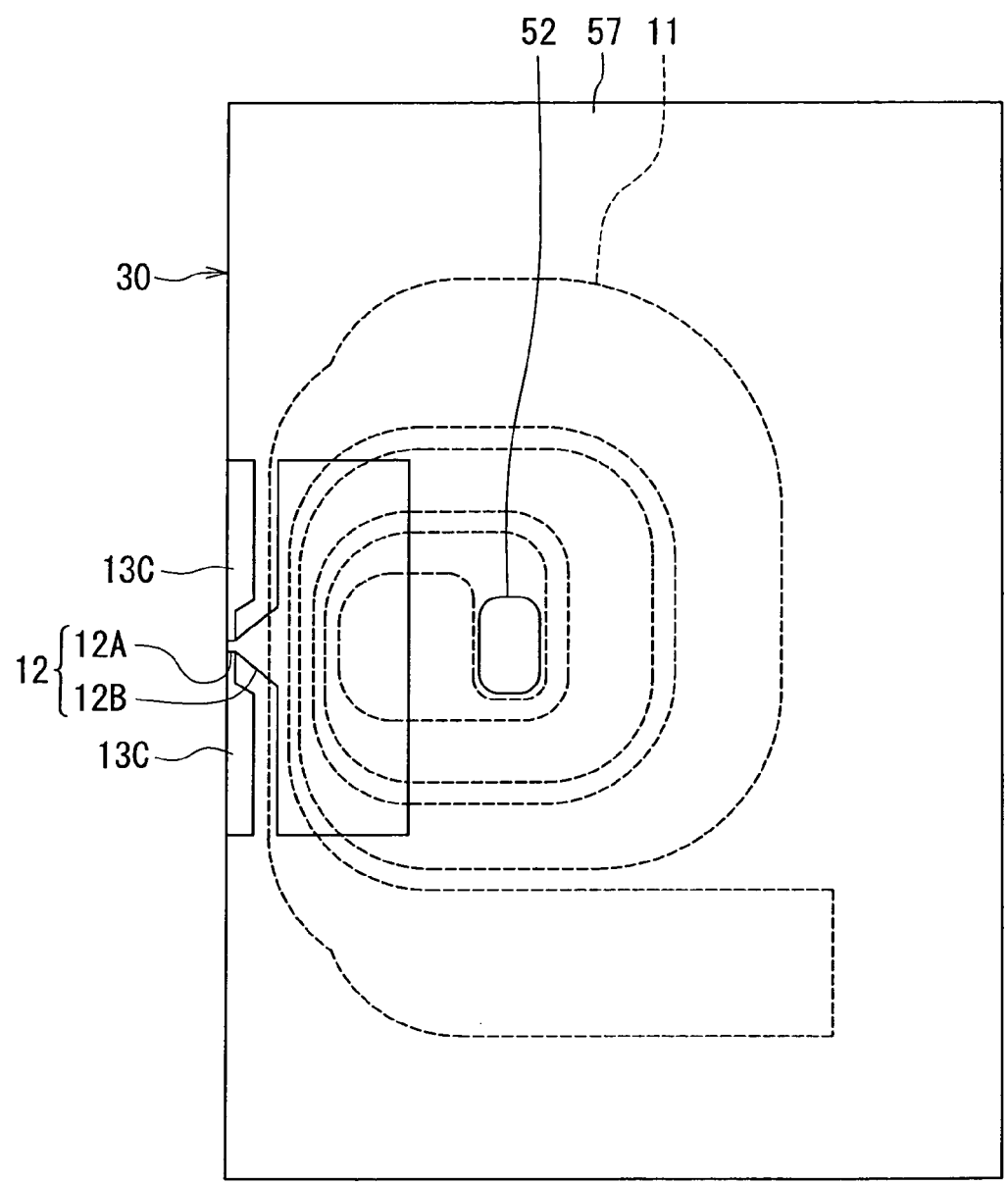
FIG. 5 is a top view showing the pole layer and elements in the neighborhood thereof in the magnetic head according to the embodiment of the invention.
Figure 6:
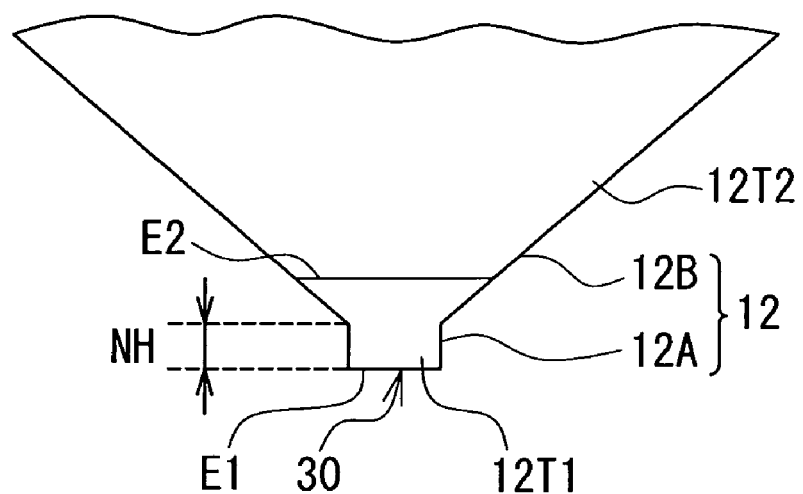
FIG. 6 is a top view showing a portion of the pole layer in the neighborhood of the medium facing surface of the magnetic head according to the embodiment of the invention.
Figure 7:
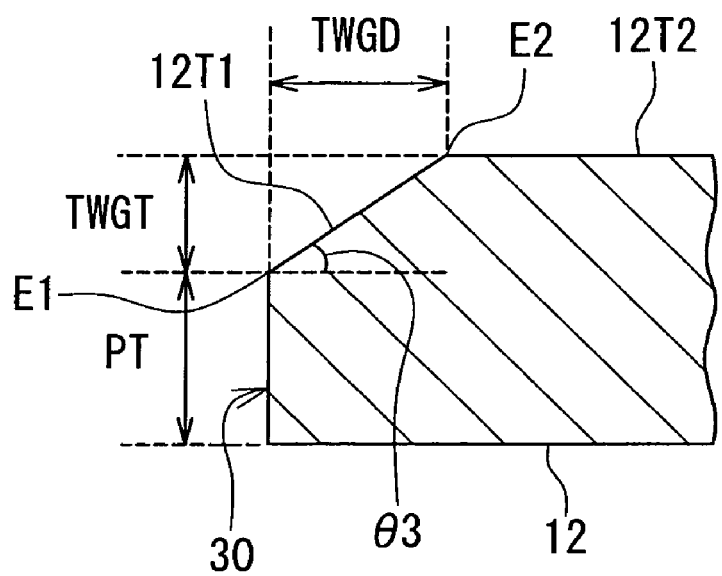
FIG. 7 is a cross-sectional view showing the portion of the pole layer in the neighborhood of the medium facing surface of the magnetic head according to the embodiment of the invention.

An embodiment of the present invention will now be described in detail with reference to the drawings. Reference is first made to FIG. 1 to FIG. 7 to describe the configuration of a magnetic head according to the embodiment of the invention. The magnetic head according to the present embodiment is for use for perpendicular magnetic recording. FIG. 1 is a perspective view showing respective portions of a pole layer and a side shield layer in the neighborhood of the medium facing surface of the magnetic head according to the present embodiment. In FIG. 1 the arrow TW indicates the track width direction. FIG. 2 is a cross-sectional view showing the configuration of the magnetic head according to the present embodiment. FIG. 2 shows a cross section perpendicular to the medium facing surface and the top surface of the substrate. In FIG. 2 the arrow T indicates the direction of travel of a recording medium. FIG. 3 is a front view showing the medium facing surface of the magnetic head according to the present embodiment. FIG. 4 is a cross-sectional view taken along line 4-4 of FIG. 2. FIG. 5 is a top view showing the pole layer and elements in the neighborhood thereof in the magnetic head according to the present embodiment. FIG. 6 is a top view showing a portion of the pole layer in the neighborhood of the medium facing surface of the magnetic head according to the present embodiment. FIG. 7 is a cross-sectional view showing the portion of the pole layer in the neighborhood of the medium facing surface of the magnetic head according to the present embodiment.

As shown in FIG. 2 to FIG. 4, the magnetic head according to the present embodiment includes: a substrate 1 formed of a ceramic material such as aluminum oxide-titanium carbide ($Al_2O_3$—TiC); an insulating layer 2 formed of an insulating material such as alumina ($Al_2O_3$) and disposed on the substrate 1; a bottom shield layer 3 formed of a magnetic material and disposed on the insulating layer 2; a bottom shield gap film 4 that is an insulating film disposed on the bottom shield layer 3; a magnetoresistive (MR) element 5 as a read element disposed on the bottom shield gap film 4; a top shield gap film 6 that is an insulating film disposed on the MR element 5; and a top shield layer 7 formed of a magnetic material and disposed on the top shield gap film 6.

An end of the MR element 5 is located in the medium facing surface 30 that faces toward the recording medium. The MR element 5 may be an element formed of a magneto-sensitive film that exhibits a magnetoresistive effect, such as an AMR (anisotropic magnetoresistive) element, a GMR (giant magnetoresistive) element, or a TMR (tunneling magnetoresistive) element. The GMR element may be of a CIP (current-in-plane) type wherein a current used for detecting magnetic signals is fed in a direction nearly parallel to the planes of layers constituting the GMR element, or may be of a CPP (current-perpendicular-to-plane) type wherein a current used for detecting magnetic signals is fed in a direction nearly perpendicular to the planes of the layers constituting the GMR element.

The portion from the bottom shield layer 3 to the top shield layer 7 makes up a read head. The magnetic head further includes a nonmagnetic layer 8 formed of a nonmagnetic material and disposed on the top shield layer 7, and a write head disposed on the nonmagnetic layer 8. The nonmagnetic layer 8 is formed of alumina, for example. The write head includes a first coil 11, a second coil 18, a pole layer 12, a shield 13, a top gap layer 14, and a side gap layer 27.

Each of the first coil 11 and the second coil 18 is planar spiral-shaped. In addition, the first coil 11 and the second coil 18 are connected in series or in parallel. In FIG. 2, the reference sign 11a indicates a connecting portion of the first coil 11 connected to the second coil 18, and the reference sign 18a indicates a connecting portion of the second coil 18 connected to the first coil 11. The magnetic head further includes connecting layers 51, 52 and 53 stacked in this order on the connecting portion 11a. The connecting layers 51, 52 and 53 are each formed of a conductive material. The connecting portion 18a is disposed on the connecting layer 53.

The first coil 11 and the second coil 18 generate magnetic fields corresponding to data to be written on the recording medium. The pole layer 12 has an end face located in the medium facing surface 30, allows magnetic fluxes corresponding to the magnetic fields generated by the coils 11 and 18 to pass, and generates a write magnetic field for writing the data on the recording medium by means of the perpendicular magnetic recording system.

The shield 13 includes: a first portion 13A disposed backward of the pole layer 12 along the direction T of travel of the recording medium; a second portion 13B disposed forward of the pole layer 12 along the direction T of travel of the recording medium; and a side shield layer 13C. The first portion 13A, the second portion 13B and the side shield layer 13C are each formed of a magnetic material. The material of these can be any of CoFeN, CoNiFe, NiFe and CoFe, for example.

As shown in FIG. 1, the side shield layer 13C has a first end face 13C1 located in the medium facing surface 30 and a second end face 13C2 opposite to the first end face 13C1. The first end face 13C1 includes two portions 13C11 and 13C12 located on both sides of the end face of the pole layer 12 that are opposite to each other in the track width direction. The side shield layer 13C further has a first groove 13Ca that opens in the top surface of the side shield layer 13C and that accommodates a portion of the pole layer 12. In FIG. 1 the first groove 13Ca does not penetrate the side shield layer 13C; however, the first groove 13Ca may penetrate the side shield layer 13C.

The first portion 13A of the shield 13 includes a first layer 13A1, a second layer 13A2 and a third layer 13A3 that are magnetically coupled. The second layer 13A2 is disposed on the nonmagnetic layer 8. The second layer 13A2 has an end face that is closer to the medium facing surface 30, and this end face is located at a distance from the medium facing surface 30. The magnetic head further includes an insulating layer 21 formed of an insulating material and disposed around the second layer 13A2 on the nonmagnetic layer 8, and an insulating layer 22 formed of an insulating material and disposed on a portion of the top surface the second layer 13A2. The insulating layers 21 and 22 are formed of alumina, for example. The first coil 11 is disposed on the insulating layer 22.

The first layer 13A1 and the third layer 13A3 are disposed on the second layer 13A2. The first layer 13A1 is disposed between the medium facing surface 30 and the coil 11. The third layer 13A3 is disposed farther from the medium facing surface 30 than is the first layer 13A1. The coil 11 is wound around the third layer 13A3. The side shield layer 13C is disposed on the first layer 13A1.

The magnetic head further includes an insulating layer 23 formed of an insulating material and disposed around the coil 11 and in the space between every adjacent turns of the coil 11, and an insulating layer 24 disposed around the insulating layer 23, the first layer 13A1 and the third layer 13A3 and on the top surfaces of the coil 11 and the insulating layer 23. The top surfaces of the first layer 13A1, the third layer 13A3 and the insulating layer 24 are flattened. The insulating layer 24 has an opening for exposing the top surface of the connecting portion 11a of the coil 11. The insulating layer 23 is formed of photoresist, for example. The insulating layer 24 is formed of alumina, for example. The coil 11 is formed of a conductive material such as copper.

The magnetic head further includes a nonmagnetic metal layer 56 formed of a nonmagnetic metal material and disposed on the top surface of the insulating layer 24 around the side shield layer 13C and the connecting layer 51. The nonmagnetic metal layer 56 has an opening for exposing the top surface of the first layer 13A1, an opening for exposing the top surface of the third layer 13A3, and an opening for exposing the top surface of the connecting portion 11a of the coil 11. Ru or NiCr, for example, is used as the material of the nonmagnetic metal layer 56.

The magnetic head further includes an encasing layer 25 formed of a nonmagnetic material and disposed on the nonmagnetic metal layer 56. The encasing layer 25 has a front end face 25b that touches the second end face 13C2 of the side shield layer 13C, and a second groove 25a that opens in the top surface of the encasing layer 25. The encasing layer 25 is disposed on a side of the side shield layer 13C opposite to the medium facing surface 30. The second groove 25a accommodates a portion of the pole layer 12 other than the portion thereof accommodated in the first groove 13Ca of the side shield layer 13C. The encasing layer 25 has an opening for exposing the top surface of the connecting portion 11a of the coil 11. Materials usable for the encasing layer 25 include an insulating material such as alumina, silicon oxide ($SiO_x$) or silicon oxynitride (SiON), and a nonmagnetic metal material such as Ru, Ta, Mo, Ti, W, NiCu, NiB or NiP.

The magnetic head further includes an etching mask layer 57 formed of a nonmagnetic metal material and disposed on the encasing layer 25. The etching mask layer 57 has a penetrating opening, and the edge of this opening is located directly above the edge of the groove 25a at the top surface of the encasing layer 25. The etching mask layer 57 is formed of a Ru layer, or a stack of a Ru layer and a NiCr layer.

The side gap layer 27 lies along the respective wall faces of the groove 13Ca of the side shield layer 13C, the groove 25a of the encasing layer 25 and the opening of the etching mask layer 57. The side gap layer 27 is formed of a nonmagnetic material. For example, alumina is used as the material of the side gap layer 27.

The magnetic head further includes a nonmagnetic metal layer 28 formed of a nonmagnetic metal material and disposed on the side gap layer 27. For example, Ru is used as the material of the nonmagnetic metal layer 28. The nonmagnetic metal layer 28 is used as an electrode and a seed layer when forming the pole layer 12 by plating. The side gap layer 27 and the nonmagnetic metal layer 28 each have an opening for exposing the top surface of the third layer 13A3 and an opening for exposing the top surface of the connecting portion 11a of the coil 11.

The pole layer 12 is accommodated in the grooves 13Ca and 25a and in the opening of the etching mask layer 57 such that the side gap layer 27 and the nonmagnetic metal layer 28 are interposed between the pole layer 12 and the respective wall faces of the grooves 13Ca and 25a and the opening of the etching mask layer 57. The pole layer 12 has a bottom surface, and a top surface opposite thereto. The bottom surface of the pole layer 12 touches the top surface of the third layer 13A3. The pole layer 12 is formed of a magnetic metal material. The material used to form the pole layer 12 may be any of NiFe, CoNiFe and CoFe, for example.

As shown in FIG. 1, FIG. 6 and FIG. 7, the top surface of the pole layer 12 includes a first portion 12T1 and a second portion 12T2. The first portion 12T1 has a first edge E1 located in the medium facing surface 30, and a second edge E2 opposite to the first edge E1. The second portion 12T2 is located farther from the medium facing surface 30 than is the first portion 12T1, and is connected to the first portion 12T1 at the second edge E2. The distance from the top surface of the substrate 1 to an arbitrary point on the first portion 12T1 decreases with decreasing distance from the arbitrary point to the medium facing surface 30. The second portion 12T2 extends in a direction substantially perpendicular to the medium facing surface 30.

As shown in FIG. 2, the magnetic head further includes an insulating layer 58 formed of an insulating material and disposed on part of the second portion 12T2, and a nonmagnetic metal layer 59 formed of a nonmagnetic metal material and disposed on the top surface of the insulating layer 58. The insulating layer 58 is formed of alumina, for example. The nonmagnetic metal layer 59 is formed of Ru, NiCr or NiCu, for example.

The top gap layer 14 is disposed to cover the first portion 12T1 of the top surface of the pole layer 12, and also the insulating layer 58 and the nonmagnetic metal layer 59. The top gap layer 14 is formed of a nonmagnetic material. The material used to form the top gap layer 14 may be an insulating material such as alumina, or a nonmagnetic conductive material such as Ru, NiCu, Ta, W, NiB or NiP.

The second portion 13B of the shield 13 includes a top shield layer 13B1, a second layer 13B2, a third layer 13B3, a fourth layer 13B4, a fifth layer 13B5, a sixth layer 13B6, and a top yoke layer 13B7 that are magnetically coupled. The top shield layer 13B1 is disposed on the side shield layer 13C and the top gap layer 14, thereby touching the top surfaces of the side shield layer 13C and the top gap layer 14. The top shield layer 13B1 has an end face located in the medium facing surface 30 at a position forward of the end face of the pole layer 12 along the direction T of travel of the recording medium. In the medium facing surface 30, part of the end face of the top shield layer 13B1 is located at a predetermined distance from the end face of the pole layer 12, the distance being created by the thickness of the top gap layer 14. The thickness of the top gap layer 14 is preferably within a range of 5 to 60 nm, such as 30 to 60 nm, for example. The end face of the pole layer 12 has a side adjacent to the top gap layer 14, and this side defines the track width.

The top yoke layer 13B7 touches the top surface of the pole layer 12 at a position away from the medium facing surface 30. The connecting layer 52 is disposed on the connecting layer 51.

The magnetic head further includes a nonmagnetic layer 46 disposed around the top shield layer 13B1, the top yoke layer 13B7 and the connecting layer 52. The nonmagnetic layer 46 is formed of an inorganic insulating material, for example. Examples of this inorganic insulating material include alumina and silicon oxide. The top surfaces of the top shield layer 13B1, the top yoke layer 13B7, the connecting layer 52 and the nonmagnetic layer 46 are flattened.

The second layer 13B2 is disposed on the top shield layer 13B1 and thereby touches the top surface of the top shield layer 13B1. The second layer 13B2 has an end face that is closer to the medium facing surface 30, and this end face is located at a distance from the medium facing surface 30. The sixth layer 13B6 is disposed on the top yoke layer 13B7. The connecting layer 53 is disposed on the connecting layer 52.

The magnetic head further includes a nonmagnetic layer 47 disposed around the second layer 13B2, the sixth layer 13B6 and the connecting layer 53. Part of the nonmagnetic layer 47 covers the end face of the second layer 13B2 that is closer to the medium facing surface 30. The nonmagnetic layer 47 is formed of an inorganic insulating material, for example. Examples of this inorganic insulating material include alumina and silicon oxide. The top surfaces of the second layer 13B2, the sixth layer 13B6, the connecting layer 53 and the nonmagnetic layer 47 are flattened.

The magnetic head further includes an insulating layer 17 formed of an insulating material and disposed on part of the top surface of the nonmagnetic layer 47. The insulating layer 17 is formed of alumina, for example. The second coil 18 is disposed on the insulating layer 17.

The third layer 13B3 is disposed on the second layer 13B2. The third layer 13B3 has an end face that is closer to the medium facing surface 30, and this end face is located at a distance from the medium facing surface 30. The fifth layer 13B5 is disposed on the sixth layer 13B6. The second coil 18 is wound around the fifth layer 13B5. The connecting portion 18a of the second coil 18 is disposed on the connecting layer 53.

The magnetic head further includes: an insulating layer 19 formed of an insulating material and disposed around the coil 18 and in the space between every adjacent turns of the coil 18; and an insulating layer 41 formed of an insulating material and disposed around the insulating layer 19, the third layer 13B3 and the fifth layer 13B5. Part of the insulating layer 19 covers the end face of the third layer 13B3 that is closer to the medium facing surface 30. The top surfaces of the third layer 13B3, the fifth layer 13B5, the coil 18 and the insulating layers 19 and 41 are flattened. The magnetic head further includes an insulating layer 20 disposed to cover the coil 18 and the insulating layer 19. The insulating layer 19 is formed of photoresist, for example. The insulating layers 20 and 41 are formed of alumina, for example. The coil 18 is formed of a conductive material such as copper.

The fourth layer 13B4 is disposed to couple the third layer 13B3 to the fifth layer 13B5. The fourth layer 13B4 has an end face that is closer to the medium facing surface 30, and this end face is located at a distance from the medium facing surface 30.

The magnetic head further includes a protection layer 42 formed of a nonmagnetic material and disposed to cover the second portion 13B. The protection layer 42 is formed of, for example, an inorganic insulating material such as alumina.

As described so far, the magnetic head according to the present embodiment includes the medium facing surface 30 that faces toward the recording medium, the read head, and the write head. The read head and the write head are stacked on the substrate 1. The read head is disposed backward along the direction T of travel of the recording medium (in other words, disposed closer to the air inflow end of the slider), while the write head is disposed forward along the direction T of travel of the recording medium (in other words, disposed closer to the air outflow end of the slider).

The read head includes: the MR element 5 as the read element; the bottom shield layer 3 and the top shield layer 7 for shielding the MR element 5, portions of the shield layers 3 and 7 located on a side of the medium facing surface 30 being opposed to each other with the MR element 5 located in between; the bottom shield gap film 4 disposed between the MR element 5 and the bottom shield layer 3; and the top shield gap film 6 disposed between the MR element 5 and the top shield layer 7.

The write head includes the first coil 11, the second coil 18, the pole layer 12, the shield 13, the top gap layer 14, and the side gap layer 27.

The pole layer 12 is accommodated in the grooves 13Ca and 25a and in the opening of the etching mask layer 57 such that the side gap layer 27 and the nonmagnetic metal layer 28 are interposed between the pole layer 12 and the respective wall faces of the grooves 13Ca and 25a and the opening of the etching mask layer 57. The side gap layer 27 has a thickness within a range of 40 to 200 nm, for example. The nonmagnetic metal layer 28 has a thickness within a range of 10 to 50 nm, for example.

The shield 13 includes: the first portion 13A disposed backward of the pole layer 12 along the direction T of travel of the recording medium; the second portion 13B disposed forward of the pole layer 12 along the direction T of travel of the recording medium; and the side shield layer 13C. The first portion 13A and the second portion 13B are magnetically coupled to each other via the side shield layer 13C. Each of the first portion 13A and the second portion 13B is connected to the pole layer 12 at a position away from the medium facing surface 30. Part of the first coil 11 passes through a space surrounded by the pole layer 12 and the first portion 13A. Part of the second coil 18 passes through a space surrounded by the pole layer 12 and the second portion 13B.

The second portion 13B includes the top shield layer 13B1. The top shield layer 13B1 has the end face located in the medium facing surface 30 at a position forward of the end face of the pole layer 12 along the direction T of travel of the recording medium. In the medium facing surface 30, part of the end face of the top shield layer 13B1 is located at a predetermined distance from the end face of the pole layer 12, the distance being created by the thickness of the gap layer 14. The end face of the pole layer 12 has a side adjacent to the gap layer 14, and this side defines the track width.

A detailed description will now be given of the shapes of the pole layer 12 and the side shield layer 13C. As shown in FIG. 5 and FIG. 6, the pole layer 12 includes a track width defining portion 12A having an end face located in the medium facing surface 30, and a wide portion 12B that is located farther from the medium facing surface 30 than is the track width defining portion 12A and that is greater in width than the track width defining portion 12A. The track width defining portion 12A has a width that does not change in accordance with the distance from the medium facing surface 30. For example, the wide portion 12B is equal in width to the track width defining portion 12A at the boundary with the track width defining portion 12A, and gradually increases in width with increasing distance from the medium facing surface 30 and then maintains a specific width to the end of the wide portion 12B. In the present embodiment, the track width defining portion 12A is a portion of the pole layer 12 from the end face located in the medium facing surface 30 to the point at which the width of the pole layer 12 starts to increase. Here, as shown in FIG. 6, the length of the track width defining portion 12A taken in the direction perpendicular to the medium facing surface 30 is called a neck height and represented by NH. The neck height NH is within a range of 0.05 to 0.3 µm, for example.

As shown in FIG. 3, the end face of the pole layer 12 located in the medium facing surface 30 has: a first side A1 closest to the top surface of the substrate 1; a second side A2 adjacent to the gap layer 14; a third side A3 connecting an end of the first side A1 to an end of the second side A2; and a fourth side A4 connecting the other end of the first side A1 to the other end of the second side A2. The second side A2 defines the track width. The end face of the pole layer 12 located in the medium facing surface 30 has a width that is taken in the track width direction (the horizontal direction in FIG. 3) and that decreases with decreasing distance from the top surface of the substrate 1. Each of the third side A3 and the fourth side A4 forms an angle within a range of, for example, 5 to 15 degrees, with respect to the direction perpendicular to the top surface of the substrate 1. The length of the second side A2, that is, the track width, is within a range of 0.05 to 0.20 µm, for example.

In the present embodiment, throat height is the distance between the medium facing surface 30 and the point at which the space between the pole layer 12 and the second portion 13B of the shield 13 starts to increase as seen from the medium facing surface 30. In the present embodiment, the throat height is equal to the distance between the medium facing surface 30 and an edge of the bottom surface of the insulating layer 58 closest to the medium facing surface 30. The throat height is within a range of 0.05 to 0.3 µm, for example.

As shown in FIG. 1, FIG. 6 and FIG. 7, the top surface of the pole layer 12 includes the first portion 12T1 and the second portion 12T2. The first portion 12T1 has the first edge E1 located in the medium facing surface 30, and the second edge E2 opposite to the first edge E1. The second portion 12T2 is located farther from the medium facing surface 30 than is the first portion 12T1, and is connected to the first portion 12T1 at the second edge E2. The distance from the top surface of the substrate 1 to an arbitrary point on the first portion 12T1 decreases with decreasing distance from the arbitrary point to the medium facing surface 30. The second portion 12T2 extends in a direction substantially perpendicular to the medium facing surface 30.

Here, as shown in FIG. 1 and FIG. 3, the first portion 12T1 forms an angle $\theta 3$ with respect to the direction perpendicular to the medium facing surface 30. The angle $\theta 3$ is within a range of 10 to 45 degrees, for example.

As shown in FIG. 7, assume that PT represents the thickness of the pole layer 12 taken in the medium facing surface 30; TWGT represents the difference in height between the first edge E1 and the second edge E2 of the first portion 12T1, that is, the difference between the first edge E1 and the second edge E2 in distance from the top surface of the substrate 1; and TWGD represents the distance from the medium facing surface 30 to the second edge E2. PT is within a range of 0.1 to 0.2 µm, for example. TWGT is within a range of 0.05 to 0.2 µm, for example. TWGD is within a range of 0.05 to 0.3 µm, for example. TWGD may be equal to or different from the neck height NH.

As shown in FIG. 1, the side shield layer 13C has the first end face 13C1 located in the medium facing surface 30 and the second end face 13C2 opposite to the first end face 13C1. The first end face 13C1 includes the two portions 13C11 and 13C12 located on both sides of the end face of the pole layer 12 that are opposite to each other in the track width direction. The side shield layer 13C further has the first groove 13Ca that opens in the top surface of the side shield layer 13C and that accommodates a portion of the pole layer 12. The distance from the medium facing surface 30 to an arbitrary point on the second end face 13C2 decreases with decreasing distance from the arbitrary point to the top surface of the substrate 1. Here, the second end face 13C2 forms an angle $\theta 1$ with respect to the direction perpendicular to the top surface of the substrate 1. The angle $\theta 1$ is within a range of 10 to 40 degrees, for example.

A shown in FIG. 1, the portion of the pole layer 12 accommodated in the first groove 13Ca of the side shield layer 13C has a first side surface S1 and a second side surface S2 that are opposite to each other in the track width direction. The distance between the first side surface S1 and the second side surface S2 taken in the track width direction decreases with decreasing distance from the top surface of the substrate 1. Here, as shown in FIG. 1, each of the first and second side surfaces S1 and S2 forms an angle θ2 with respect to the direction perpendicular to the top surface of the substrate 1. The angle θ2 is within a range of 5 to 15 degrees, for example.

As shown in FIG. 4, the portion of the pole layer 12 accommodated in the second groove 25a of the encasing layer 25 has a third side surface S3 and a fourth side surface S4 that are opposite to each other in the track width direction. An angle formed by each of the third and fourth side surfaces S3 and S4 with respect to the direction perpendicular to the top surface of the substrate 1 is smaller than the angle θ2 formed by each of the first and second side surfaces S1 and S2 with respect to the direction perpendicular to the top surface of the substrate. FIG. 4 shows an example in which each of the third and fourth side surfaces S3 and S4 forms a zero angle with respect to the direction perpendicular to the top surface of the substrate 1.

A method of manufacturing the magnetic head according to the present embodiment will now be described. In the method of manufacturing the magnetic head according to the present embodiment, first, as shown in FIG. 2 and FIG. 3, the insulating layer 2, the bottom shield layer 3 and the bottom shield gap film 4 are formed in this order on the substrate 1. Next, the MR element 5 and leads (not shown) connected to the MR element 5 are formed on the bottom shield gap film 4. Next, the MR element 5 and the leads are covered with the top shield gap film 6. Next, the top shield layer 7 and the nonmagnetic layer 8 are formed in this order on the top shield gap film 6.

Next, the second layer 13A2 of the first portion 13A of the shield 13 is formed on the nonmagnetic layer 8 by, e.g., frame plating. Next, the insulating layer 21 is formed on the entire top surface of the stack. Next, the insulating layer 21 is polished by, e.g., chemical mechanical polishing (hereinafter referred to as CMP), until the second layer 13A2 becomes exposed.

Next, the insulating layer 22 is formed on areas of the top surfaces of the second layer 13A2 and the insulating layer 21 where the coil 11 is to be disposed later. Next, the coil 11 is formed on the insulating layer 22 by, e.g., frame plating. Next, the first layer 13A1 and the third layer 13A3 are formed on the second layer 13A2 by, e.g., frame plating. However, the formation of the first layer 13A1 and the third layer 13A3 may precede the formation of the coil 11.

Next, the insulating layer 23 is formed around the coil 11 and the third layer 13A3 and in the space between every adjacent turns of the coil 11. Next, the insulating layer 24 is formed on the entire top surface of the stack. Next, the insulating layer 24 is polished by, e.g., CMP, until the first layer 13A1 and the third layer 13A3 become exposed, and the top surfaces of the first layer 13A1, the third layer 13A3 and the insulating layer 24 are thereby flattened. Next, the insulating layer 24 is selectively etched to form in the insulating layer 24 the opening for exposing the top surface of the connecting portion 11a of the coil 11.

Reference is now made to FIG. 8A to 20A, FIG. 8B to FIG. 20B and FIG. 8C to FIG. 20C to describe a series of steps that follows the above-described step and that finally forms the top shield layer 13B1, the top yoke layer 13B7, the connecting layer 52 and the nonmagnetic layer 46. FIG. 8A to FIG. 20A and FIG. 8B to FIG. 20B each illustrate a stack of layers formed in the course of manufacturing the magnetic head. Each of FIG. 8A to FIG. 20A shows the top surface of part of the stack. Each of FIG. 8B to FIG. 20B shows a cross section of the stack taken at the position where the medium facing surface 30 is to be formed. FIG. 8C to FIG. 20C show cross sections of the stack taken along lines 8C-8C to 20C-20C of FIG. 8A to FIG. 20A, respectively. Portions closer to the substrate 1 than the insulating layer 24 are omitted in FIG. 8B to FIG. 20B and FIG. 8C to FIG. 20C. In FIG. 8A to FIG. 20A and FIG. 8C to FIG. 20C, "ABS" indicates the position where the medium facing surface 30 is to be formed.

Figure 8A:
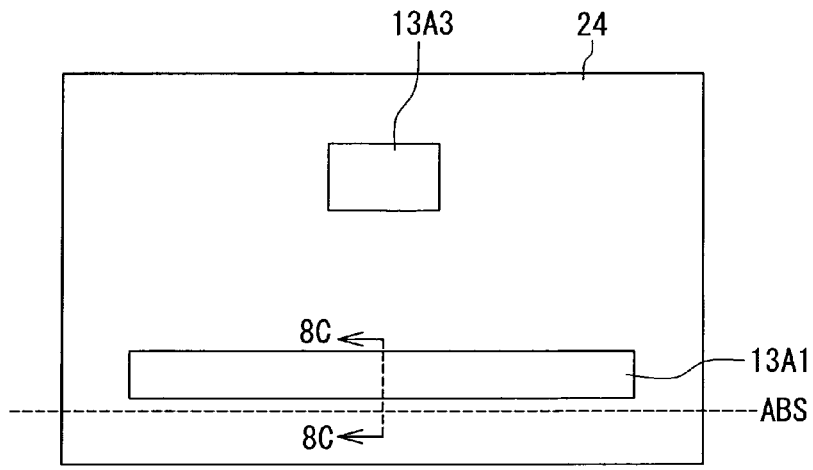
FIG. 8A to FIG. 8C are illustrative views showing a step of a method of manufacturing the magnetic head according to the embodiment of the invention.
Figure 8B:
Figure 8C:
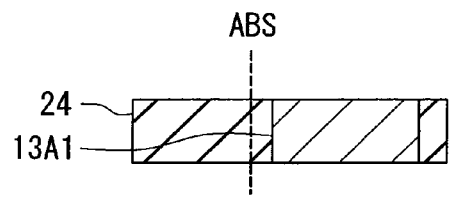

FIG. 8A to FIG. 8C show the stack in which the top surfaces of the first layer 13A1, the third layer 13A3 and the insulating layer 24 have been flattened and the insulating layer 24 has undergone the formation of the opening for exposing the top surface of the connecting portion 11a of the coil 11.

Figure 9A:
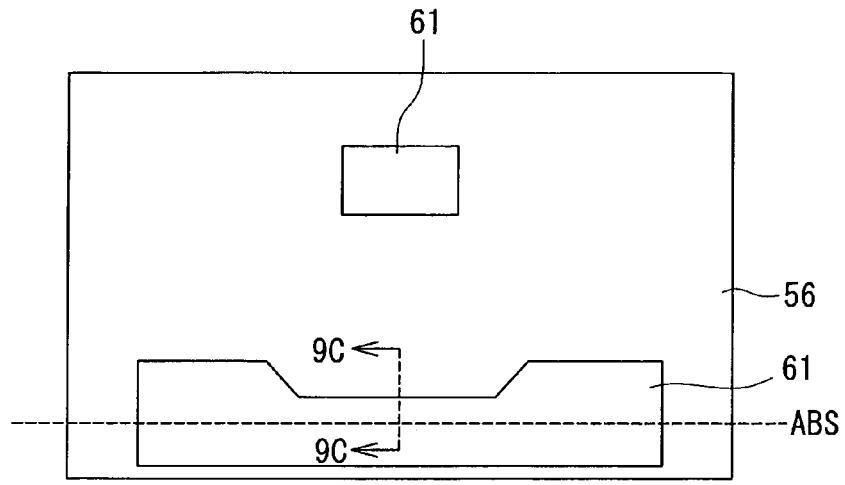
FIG. 9A to FIG. 9C are illustrative views showing a step that follows the step of FIG. 8A to FIG. 8C.
Figure 9B:
Figure 9C:
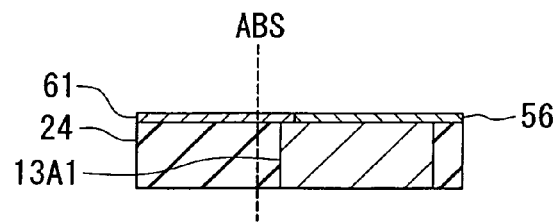

FIG. 9A to FIG. 9C show the next step. In this step, first, a magnetic seed layer 61 made of a magnetic material is formed on the entire top surface of the stack by, e.g., sputtering. For example, the magnetic seed layer 61 is formed of the same material as the side shield layer 13C to be formed later. Next, a photoresist layer is formed on the magnetic seed layer 61 and then patterned to form a photoresist mask (not shown). The photoresist mask covers an area of the magnetic seed layer 61 where the side shield layer 13C is to be disposed later, and areas of the magnetic seed layer 61 located above the third layer 13A3 and the connecting portion 11a of the coil 11. Next, the magnetic seed layer 61 except the portion thereof located below the photoresist mask is removed by, e.g., ion milling. In the area where the magnetic seed layer 61 has been removed, the nonmagnetic metal layer 56 is formed by, e.g., sputtering. Next, the photoresist mask is removed.

Figure 10A:
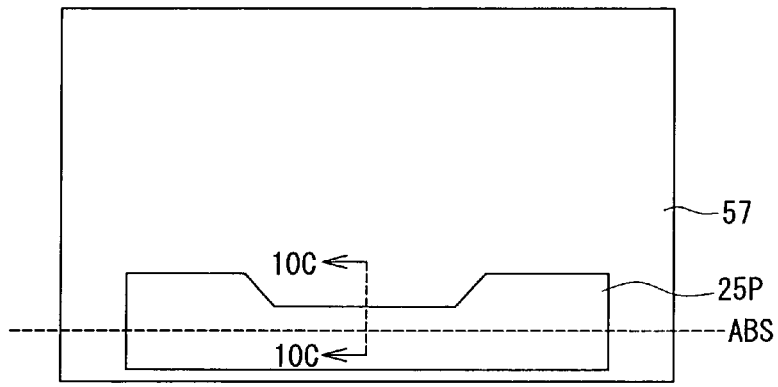
FIG. 10A to FIG. 10C are illustrative views showing a step that follows the step of FIG. 9A to FIG. 9C.
Figure 10B:
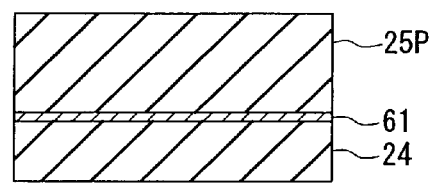
Figure 10C:
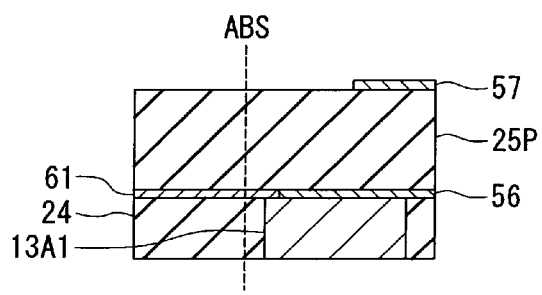

FIG. 10A to FIG. 10C show the next step. In this step, first, a nonmagnetic layer 25P is formed on the entire top surface of the stack. The nonmagnetic layer 25P is to become the encasing layer 25 later by undergoing formation of the front end face 25b and the second groove 25a. Next, a nonmagnetic metal layer that is to become the etching mask layer 57 later is formed on the top surface of the nonmagnetic layer 25P by, e.g., sputtering. Next, a photoresist layer is formed on this nonmagnetic metal layer and then patterned to form a photoresist mask (not shown). This photoresist mask covers a portion of the nonmagnetic metal layer that is to become the etching mask layer 57. Next, the nonmagnetic metal layer except the portion thereof located below the photoresist mask is removed by, e.g., ion milling. The remaining portion of the nonmagnetic metal layer thus becomes the etching mask layer 57.

Figure 11A:
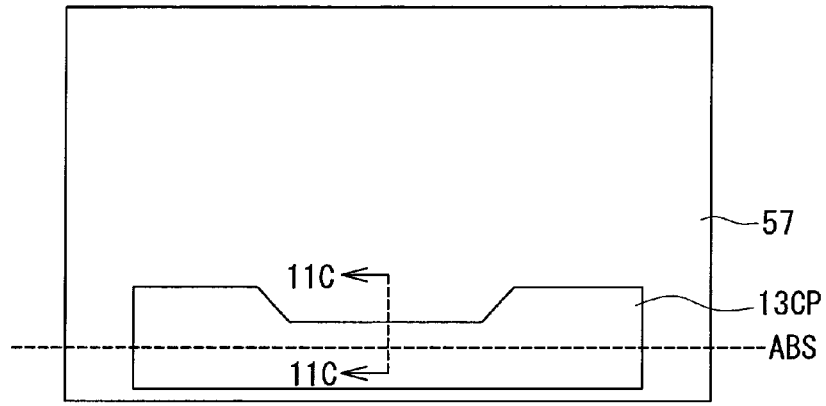
FIG. 11A to FIG. 11C are illustrative views showing a step that follows the step of FIG. 10A to FIG. 10C.
Figure 11B:
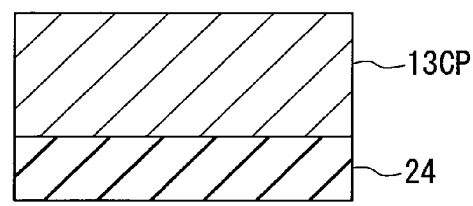
Figure 11C:
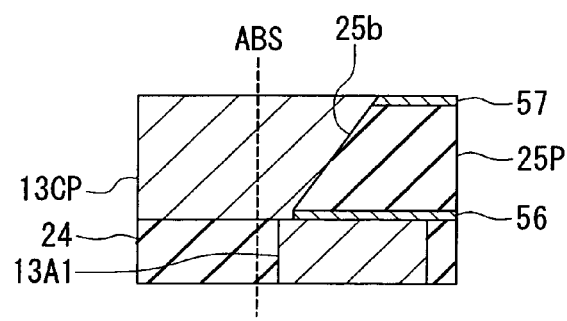

FIG. 11A to FIG. 11C show the next step. In this step, first, the nonmagnetic layer 25P is selectively etched by, e.g., reactive ion etching (hereinafter referred to as RIE), using the etching mask layer 57. The front end face 25b is thereby formed in the nonmagnetic layer 25P. Here, the nonmagnetic layer 25P is taper-etched so that the front end face 25b is formed to be inclined with respect to the direction perpendicular to the top surface of the substrate 1. Next, a magnetic layer 13CP is formed on the magnetic seed layer 61 by, e.g., frame plating. The magnetic layer 13CP is to become the side shield layer 13C later. In FIG. 11B and FIG. 11C, the magnetic layer 13CP is depicted as including the magnetic seed layer 61. The magnetic layer 13CP is formed such that the top surface thereof is located higher than the top surface of the etching mask layer 57. Next, the magnetic layer 13CP is polished by, e.g., CMP, so that the top surfaces of the magnetic layer 13CP and the etching mask layer 57 are flattened. In this etching, the etching mask layer 57 functions as a polishing stopper for stopping the polishing.

Figure 12A:
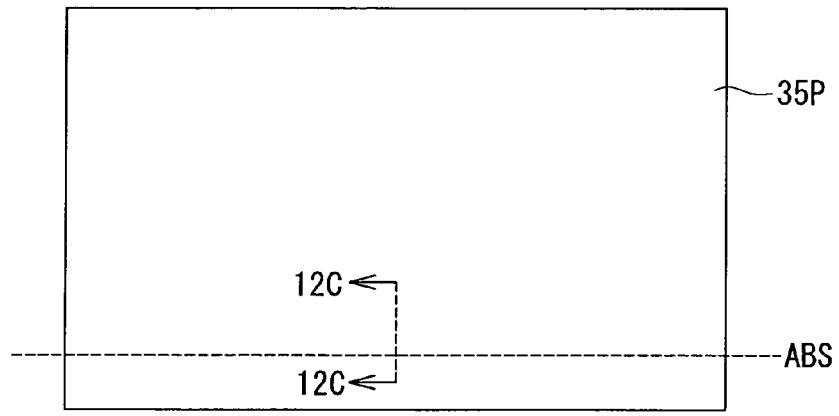
FIG. 12A to FIG. 12C are illustrative views showing a step that follows the step of FIG. 11A to FIG. 11C.
Figure 12B:
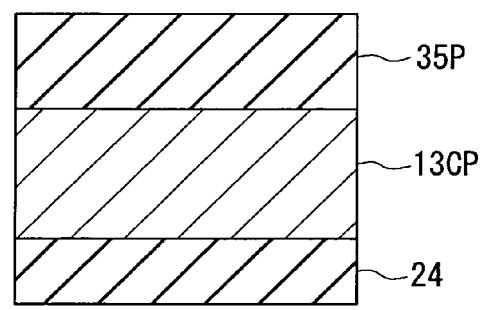
Figure 12C:
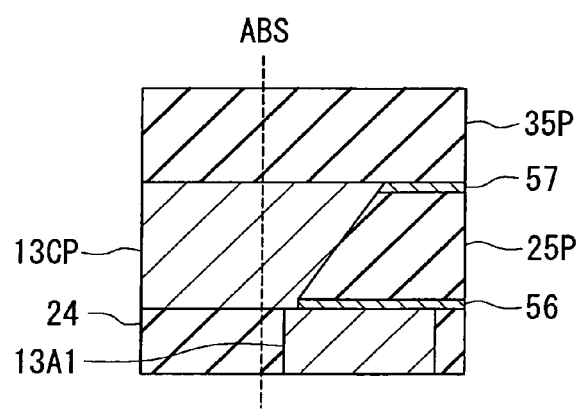

FIG. 12A to FIG. 12C show the next step. In this step, a mask-forming layer 35P is formed on the entire top surface of the stack by, e.g., sputtering. The mask-forming layer 35P is made of alumina, for example. The mask-forming layer 35P has a thickness of 300 nm or greater, for example.

Figure 13A:
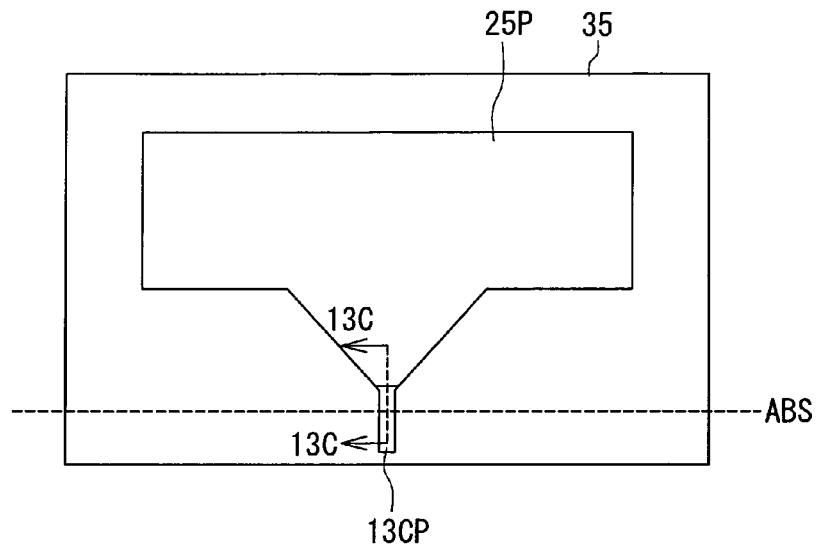
FIG. 13A to FIG. 13C are illustrative views showing a step that follows the step of FIG. 12A to FIG. 12C.
Figure 13B:
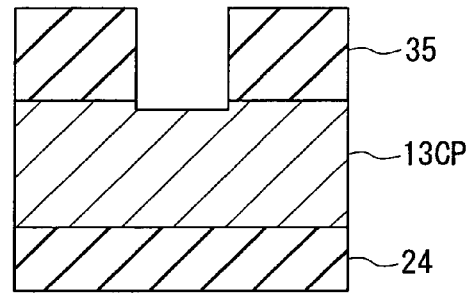
Figure 13C:
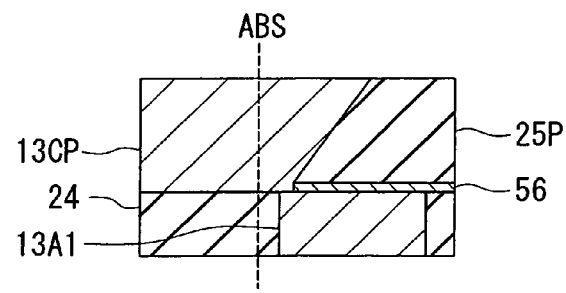

FIG. 13A to FIG. 13C show the next step. In this step, first, a photoresist layer is formed on the entire top surface of the stack and then patterned to form a photoresist mask (not shown). Next, the mask-forming layer 35P is selectively etched by, e.g., RIE, using this photoresist mask. A mask 35 is thereby formed. The mask 35 has an opening having a shape corresponding to the first groove 13Ca and the second groove 25a to be formed later. When the mask-forming layer 35P made of alumina is etched by RIE, a gas containing $Cl_2$ and $BCl_3$ is suitably used as the etching gas. In this etching gas containing $Cl_2$ and $BCl_3$, the proportion of $BCl_3$ is preferably within a range of 50% to 90%. In addition, when this etching is performed, the stack preferably has a temperature of 100° C. or lower. Next, the etching mask layer 57 is selectively removed by, e.g., ion milling, using the mask 35.

Figure 14A:
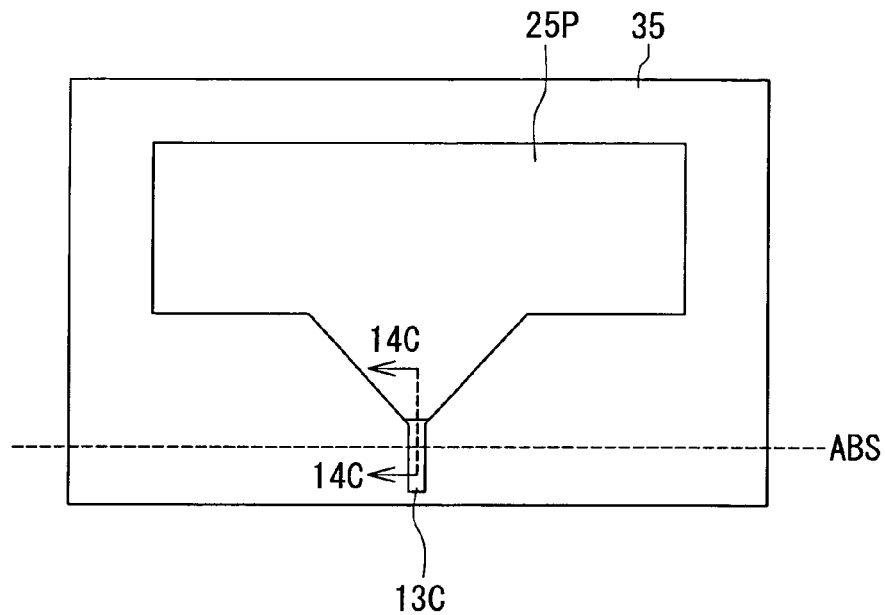
FIG. 14A to FIG. 14C are illustrative views showing a step that follows the step of FIG. 13A to FIG. 13C.
Figure 14B:
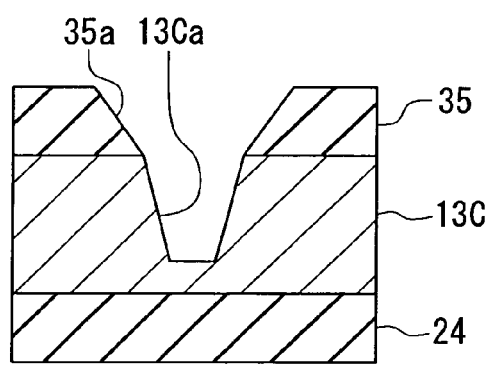
Figure 14C:
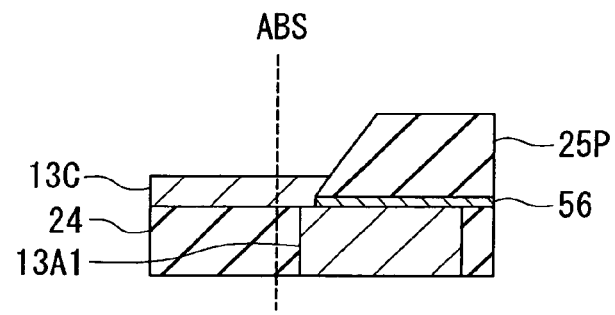

FIG. 14A to FIG. 14C show the next step. In this step, first, the magnetic layer 13CP is selectively etched by, e.g., RIE, using the mask 35. The first groove 13Ca is thereby formed in the magnetic layer 13CP. The magnetic layer 13CP thus becomes the side shield layer 13C. When the magnetic layer 13CP made of a magnetic metal material is etched by RIE, a gas that mainly contains $Cl_2$ is suitably used as the etching gas. In this case, so as to remove the chloride of the magnetic metal material produced during the etching, it is preferred that the stack have a temperature within a range of 100° C. to 200° C. when this etching is performed. Before performing RIE, plasma of an inert gas may be generated in a chamber containing the stack so that the temperature of the stack is raised to the range of 100° C. to 200° C. by using the plasma. The inert gas used in this case may be He, $N_2$ or Ne, for example.

When etching the magnetic layer 13CP to form the groove 13Ca therein, the magnetic layer 13CP is taper-etched so that the wall faces of the groove 13Ca corresponding to the first and second side surfaces S1 and S2 of the pole layer 12 each form an angle within a range of, e.g., 5 to 15 degrees, with respect to the direction perpendicular to the top surface of the substrate 1.

When the magnetic layer 13CP made of a magnetic metal material is etched by RIE using the mask 35 made of alumina, the etching selectivity is on the order of 3. Consequently, when the nonmagnetic layer 25P is made of alumina, a portion of the nonmagnetic layer 25P exposed from the opening of the mask 35 remains after the etching.

Figure 15A:
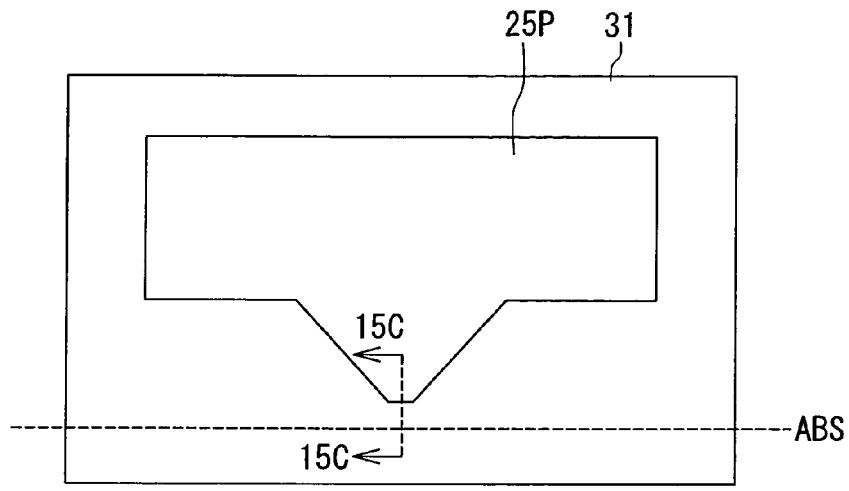
FIG. 15A to FIG. 15C are illustrative views showing a step that follows the step of FIG. 14A to FIG. 14C.
Figure 15B:
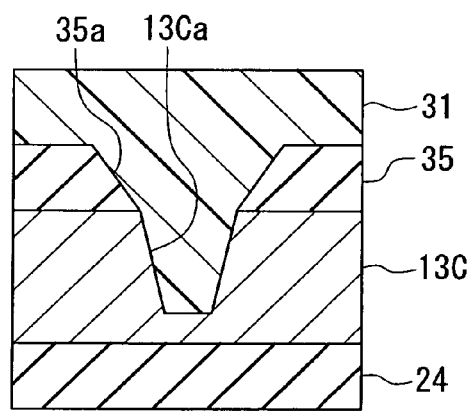
Figure 15C:
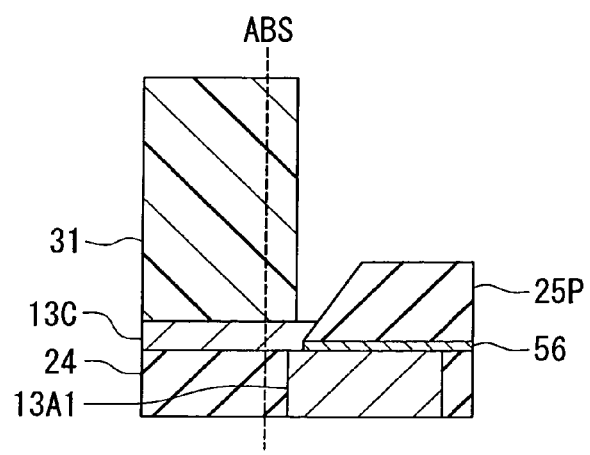

FIG. 15A to FIG. 15C show the next step. In this step, a photoresist mask 31 is formed on the stack. The photoresist mask 31 is to be used for etching the portion of the nonmagnetic layer 25P exposed from the opening of the mask 35 and a portion of the nonmagnetic layer 25P located above the connecting portion 11a of the coil 11. The photoresist mask 31 has an opening having a shape corresponding to the second groove 25a and an opening having a shape corresponding to the connecting layer 51.

Figure 16A:
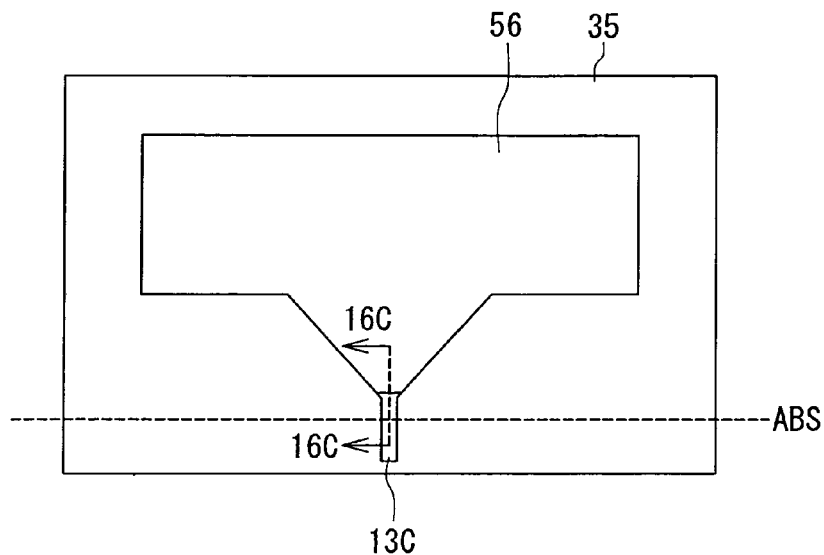
FIG. 16A to FIG. 16C are illustrative views showing a step that follows the step of FIG. 15A to FIG. 15C.
Figure 16B:
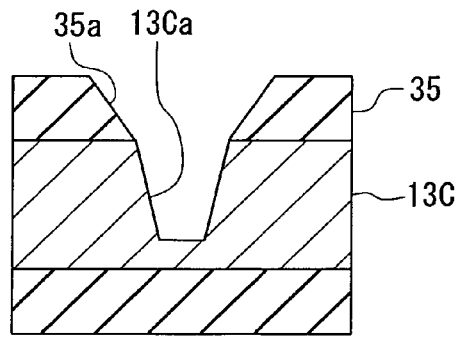
Figure 16C:
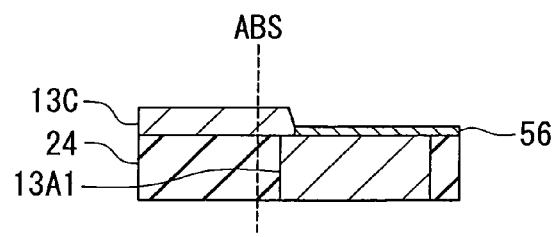

FIG. 16A to FIG. 16C show the next step. In this step, a portion of the nonmagnetic layer 25P exposed from the opening of the mask 31 is selectively etched by, e.g., RIE. The conditions for this RIE are the same as the conditions for the RIE performed to etch the magnetic layer 13CP using the mask 35. As a result of this etching, the second groove 25a is formed in the nonmagnetic layer 25P, and the nonmagnetic layer 25P thereby becomes the encasing layer 25. In this etching, the nonmagnetic metal layer 56 functions as an etching stopper for stopping the etching. This etching is performed such that an angle formed by each of the wall faces of the groove 25a corresponding to the third and fourth side surfaces S3 and S4 of the pole layer 12 with respect to the direction perpendicular to the top surface of the substrate 1 is smaller than the angle formed by each of the wall faces of the groove 13Ca corresponding to the first and second side surfaces S1 and S2 of the pole layer 12 with respect to direction perpendicular to the top surface of the substrate 1.

Figure 17A:
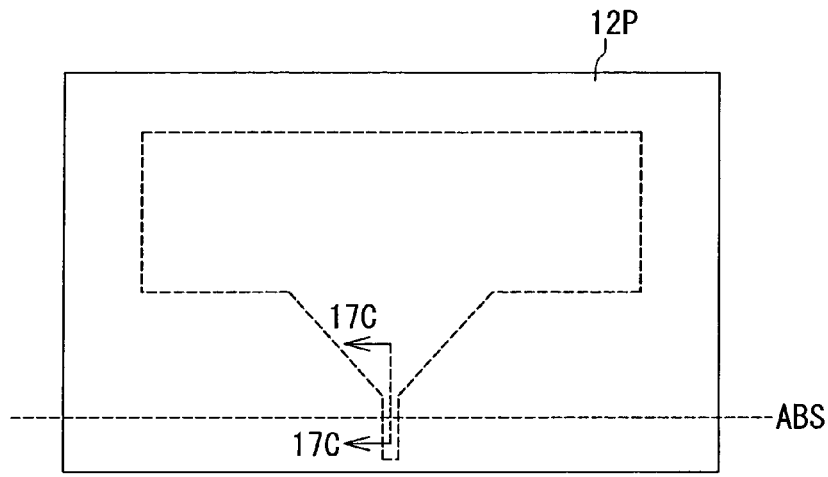
FIG. 17A to FIG. 17C are illustrative views showing a step that follows the step of FIG. 16A to FIG. 16C.
Figure 17B:
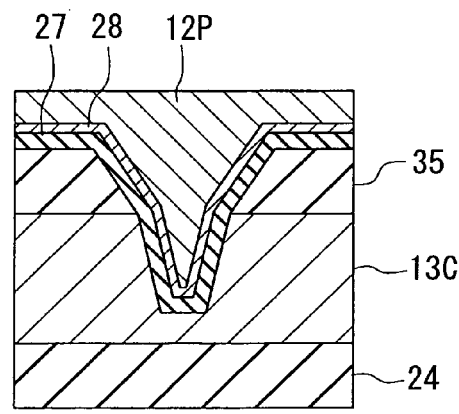
Figure 17C:
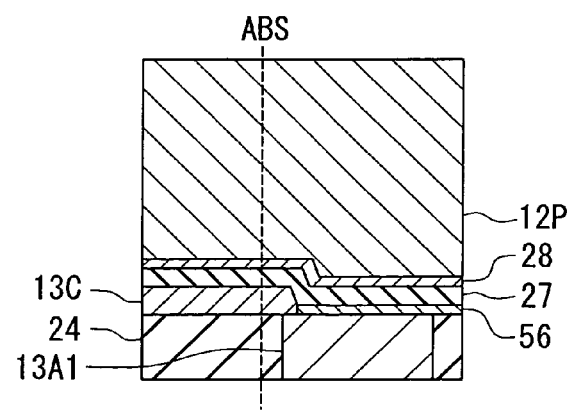

FIG. 17A to FIG. 17C show the next step. In this step, first, the side gap layer 27 is formed on the entire top surface of the stack. The side gap layer 27 is formed also in the groove 13Ca of the side shield layer 13C, the groove 25a of the encasing layer 25 and the opening of the etching mask layer 57. The side gap layer 27 is formed by, e.g., sputtering, chemical vapor deposition (CVD), or atomic layer deposition (ALD). Next, the nonmagnetic metal layer 28 is formed on the entire top surface of the stack by, e.g., sputtering. The nonmagnetic metal layer 28 is formed also in the groove 13Ca of the side shield layer 13C, the groove 25a of the encasing layer 25 and the opening of the etching mask layer 57.

Next, the side gap layer 27 and the nonmagnetic metal layer 28 are selectively etched to form in each of the side gap layer 27 and the nonmagnetic metal layer 28 the opening for exposing the top surface of the third layer 13A3 and the opening for exposing the top surface of the connecting portion 11a of the coil 11. Next, a magnetic layer 12P is formed by, e.g., frame plating. The magnetic layer 12P is to become the pole layer 12 and the connecting layer 51 later. The magnetic layer 12P is formed to fill the grooves 13Ca and 25a and to have a top surface located higher than the top surfaces of the side shield layer 13C the etching mask layer 57.

Figure 18A:
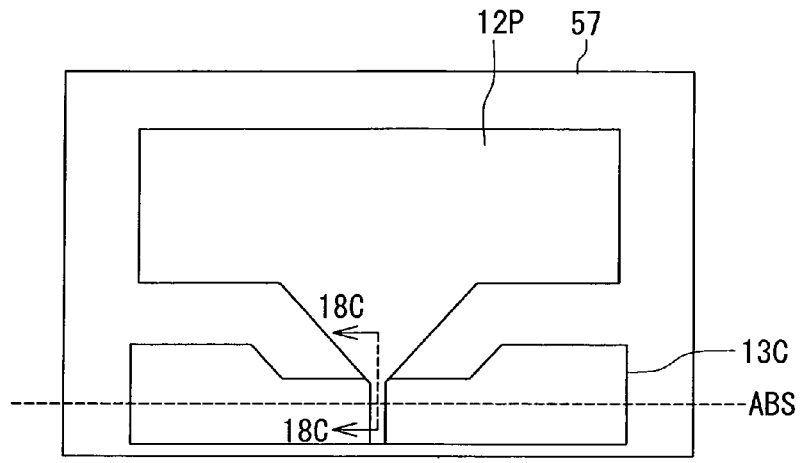
FIG. 18A to FIG. 18C are illustrative views showing a step that follows the step of FIG. 17A to FIG. 17C.
Figure 18B:
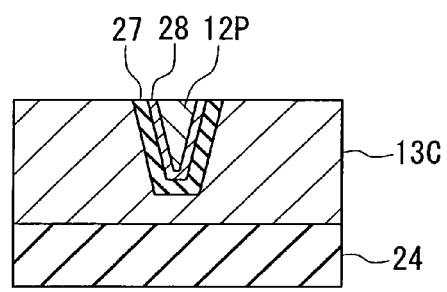
Figure 18C:
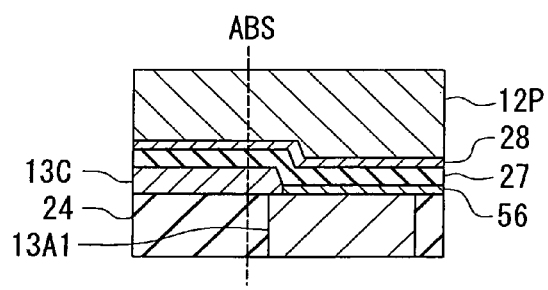

FIG. 18A to FIG. 18C show the next step. In the step shown in FIG. 18A to FIG. 18C and in the next step shown in FIG. 19A to FIG. 19C, the magnetic layer 12P is processed into the pole layer 12. In the step shown in FIG. 18A to FIG. 18C, the top surfaces of the magnetic layer 12P, the side shield layer 13C and the etching mask layer 57 are flattened by polishing the magnetic layer 12P and other layers by, e.g., CMP, until the side shield layer 13C and the etching mask layer 57 become exposed. In this polishing, the etching mask layer 57 functions as a polishing stopper for stopping the polishing.

Figure 19A:
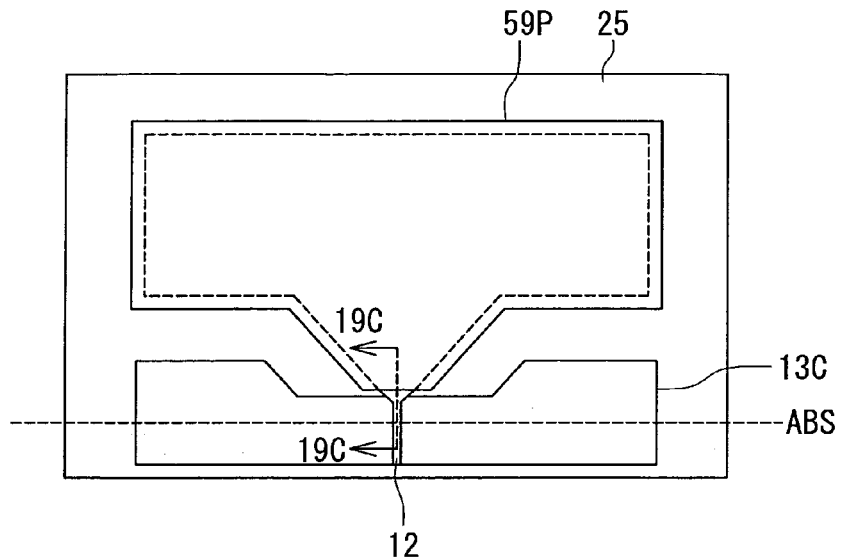
FIG. 19A to FIG. 19C are illustrative views showing a step that follows the step of FIG. 18A to FIG. 18C.
Figure 19B:
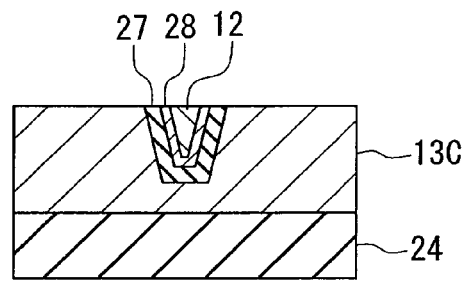
Figure 19C:
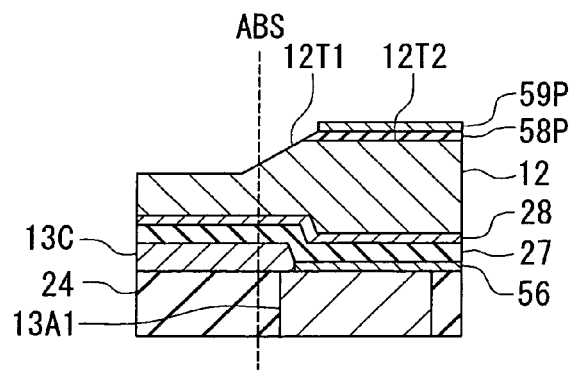

FIG. 19A to FIG. 19C show the next step. In this step, first, mask layers 58P and 59P are formed to be stacked on the magnetic layer 12P and the encasing layer 25. The mask layer 58P is to become the insulating layer 58 later, and the mask layer 59P is to become the nonmagnetic metal layer 59 later. The mask layers 58P and 59P are formed by, e.g., etching a layered film formed by sputtering and thereby patterning the layered film. The mask layers 58P and 59P cover a portion of the top surface of the magnetic layer 12P that is to become the second portion 12T2 of the top surface of the pole layer 12 later. An edge of the mask layer 58P that is closer to the position ABS where to form the medium facing surface 30 defines the position of the boundary between the first portion 12T1 and the second portion 12T2 of the top surface of the pole layer 12. Next, portions of the magnetic layer 12P, the side shield layer 13C, the encasing layer 25 and the etching mask layer 57 are etched by, e.g., ion milling, using the mask layers 58P and 59P. This forms the first portion 12T1 and the second portion 12T2 in the top surface of the magnetic layer 12P, and the magnetic layer 12P thereby becomes the pole layer 12.

Figure 20A:
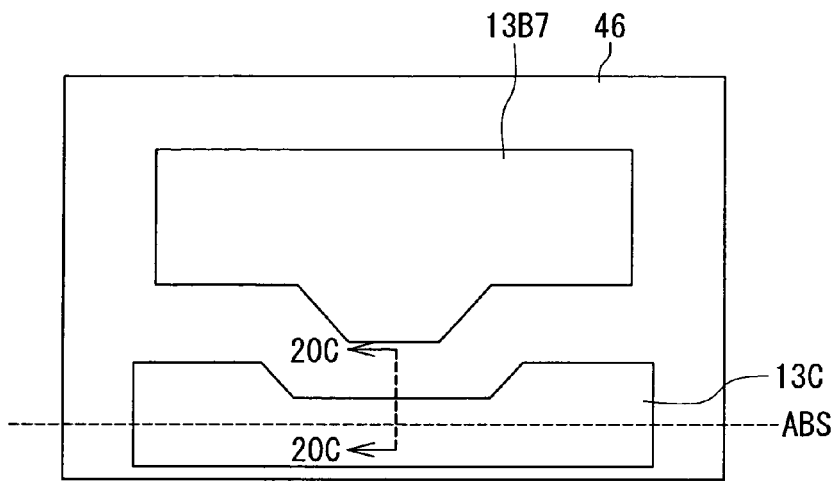
FIG. 20A to FIG. 20C are illustrative views showing a step that follows the step of FIG. 19A to FIG. 19C.
Figure 20B:
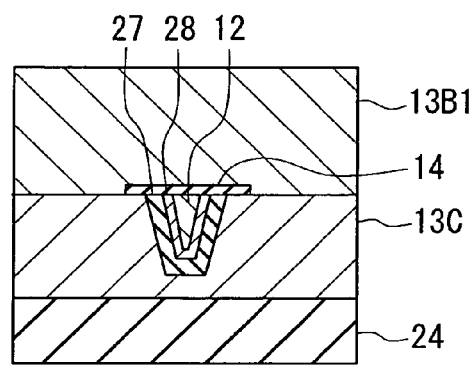
Figure 20C:
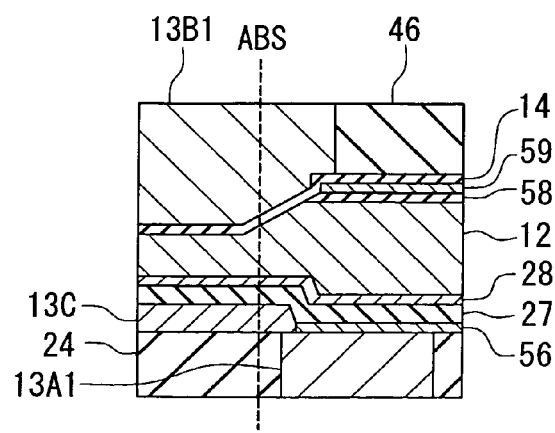

FIG. 20A to FIG. 20C show the next step. In this step, first, the top gap layer 14 is formed on the entire top surface of the stack by, e.g., sputtering or CVD. Next, the top gap layer 14 and the mask layers 58P and 59P are selectively etched by, e.g., ion milling, so that part of the top surface of the pole layer 12, part of the top surface of the side shield layer 13C, and the top surface of the connecting layer 51 are exposed. The mask layers 58P and 59P thereby become the insulating layer 58 and the nonmagnetic metal layer 59, respectively. Next, the top shield layer 13B1 is formed on the side shield layer 13C and the top gap layer 14; the top yoke layer 13B7 is formed on the pole layer 12; and the connecting layer 52 is formed on the connecting layer 51, each by frame plating, for example. Next, the nonmagnetic layer 46 is formed on the entire top surface of the stack. Next, the nonmagnetic layer 46 is polished by, e.g., CMP, until the top shield layer 13B1, the top yoke layer 13B7 and the connecting layer 52 become exposed, and the top surfaces of the top shield layer 13B1, the top yoke layer 13B7, the connecting layer 52 and the nonmagnetic layer 46 are thereby flattened.

Next, as shown in FIG. 2, the second layer 13B2 is formed on the top shield layer 13B1; the sixth layer 13B6 is formed on the top yoke layer 13B7; and the connecting layer 53 is formed on the connecting layer 52, each by frame plating, for example. Next, the nonmagnetic layer 47 is formed on the entire top surface of the stack. Next, the nonmagnetic layer 47 is polished by, e.g., CMP, until the second layer 13B2, the sixth layer 13B6 and the connecting layer 53 become exposed.

Next, the insulating layer 17 is formed on an area of the top surface of the nonmagnetic layer 47 where the coil 18 is to be disposed later. Next, the coil 18 is formed on the insulating layer 17 by, e.g., frame plating. Next, the third layer 13B3 is formed on the second layer 13B2, and the fifth layer 13B5 is formed on the sixth layer 13B6, each by frame plating, for example. However, the formation of the third layer 13B3 and the fifth layer 13B5 may precede the formation of the coil 18.

Next, the insulating layer 19 is formed around the coil 18 and the fifth layer 13B5 and in the space between every adjacent turns of the coil 18. Next, the insulating layer 41 is formed on the entire top surface of the stack. Next, the insulating layer 41 is polished by, e.g., CMP, until the third layer 13B3, the fifth layer 13B5 and the coil 18 become exposed, and the top surfaces of the third layer 13B3, the fifth layer 13B5, the coil 18 and the insulating layers 19 and 41 are thereby flattened.

Next, the insulating layer 20 is formed on the entire top surface of the stack by, e.g., sputtering. Next, the insulating layer 20 is selectively etched to form in the insulating layer 20 an opening for exposing the top surface of the third layer 13B3 and an opening for exposing the top surface of the fifth layer 13B5. Next, the fourth layer 13B4 of the second portion 13B is formed by, e.g., frame plating. The shield layer 13 is thereby completed.

Next, the protection layer 42 is formed to cover the entire top surface of the stack. Next, wiring, terminals and so on are formed on the protection layer 42, the substrate is cut into sliders, and processing including polishing of the medium facing surface 30 and fabrication of flying rails is performed, whereby the magnetic head is completed.

The operation and effects of the magnetic head according to the present embodiment will now be described. In this magnetic head, the write head writes data on a recording medium while the read head reads data written on the recording medium. In the write head, the coils 11 and 18 generate magnetic fields corresponding to data to be written on the recording medium. A magnetic flux corresponding to the magnetic field generated by the coil 11 passes through the first portion 13A of the shield 13 and the pole layer 12. A magnetic flux corresponding to the magnetic field generated by the coil 18 passes through the second portion 13B of the shield 13 and the pole layer 12. Consequently, the pole layer 12 allows the magnetic flux corresponding to the magnetic field generated by the coil 11 and the magnetic flux corresponding to the magnetic field generated by the coil 18 to pass.

The coils 11 and 18 may be connected in series or in parallel. In either case, the coils 11 and 18 are connected such that the magnetic flux corresponding to the magnetic field generated by the coil 11 and the magnetic flux corresponding to the magnetic field generated by the coil 18 flow in the same direction in the pole layer 12.

The pole layer 12 allows the magnetic fluxes corresponding to the magnetic fields generated by the coils 11 and 18 to pass as mentioned above, and generates a write magnetic field used for writing data on the recording medium by means of the perpendicular magnetic recording system.

The shield 13 takes in a disturbance magnetic field applied to the magnetic head from outside of the magnetic head. As a result, it is possible to prevent erroneous writing on the recording medium induced by the disturbance magnetic field intensively taken into the pole layer 12. Furthermore, the shield 13 has a function of taking in a magnetic flux that is generated from the end face of the pole layer 12 and that expands in directions except the direction perpendicular to the plane of the recording medium, and thus preventing this magnetic flux from reaching the recording medium. The shield 13 also has a function of returning a magnetic flux that has been generated from the end face of the pole layer 12 and has magnetized the recording medium.

The shield 13 includes: the first portion 13A disposed backward of the pole layer 12 along the direction T of travel of the recording medium; the second portion 13B disposed forward of the pole layer 12 along the direction T of travel of the recording medium; and the side shield layer 13C. Consequently, according to the present embodiment, in regions both backward and forward of the end face of the pole layer 12 along the direction T of travel of the recording medium and in regions on both sides of the end face of the pole layer 12 that are opposite to each other in the track width direction, it is possible to take in the magnetic flux that is generated from the end face of the pole layer 12 and that expands in directions except the direction perpendicular to the plane of the recording medium, and to thereby prevent this flux from reaching the recording medium. Thus, according to the present embodiment, it is possible to suppress the occurrence of adjacent track erasing, and it is also possible to suppress, over a wide range along the track width direction, a phenomenon of attenuation of signals written on one or more tracks adjacent to a track targeted for writing or reading. Furthermore, according to the present embodiment, the presence of the side shield layer 13C particularly makes it possible to suppress the occurrence of adjacent track erasing with higher reliability, compared with a case without the side shield layer 13C.

In the present embodiment, the distance from the medium facing surface 30 to an arbitrary point on the second end face 13C2 of the side shield layer 13C decreases with decreasing distance from the arbitrary point to the top surface of the substrate 1. Consequently, the distance between the pole layer 12 and an arbitrary point on the second end face 13C2 of the side shield layer 13C increases with decreasing distance from the arbitrary point to the top surface of the substrate 1. This makes it possible to suppress the leakage of a magnetic flux from the pole layer 12 to the side shield layer 13C. From the foregoing, the present embodiment makes it possible to suppress the occurrence of adjacent track erasing and to improve the write characteristics (overwrite property).

In the present embodiment, as shown in FIG. 3, in the medium facing surface 30 the width of the end face of the pole layer 12 taken in the track width direction decreases with decreasing distance from the top surface of the substrate 1.

According to the present embodiment, it is thus possible to suppress the occurrence of adjacent track erasing resulting from the skew.

In the present embodiment, the portion of the pole layer 12 accommodated in the first groove 13Ca of the side shield layer 13C has the first side surface S1 and the second side surface S2 that are opposite to each other in the track width direction, while the portion of the pole layer 12 accommodated in the second groove 25a of the encasing layer 25 has the third side surface S3 and the fourth side surface S4 that are opposite to each other in the track width direction. The angle formed by each of the third and fourth side surfaces S3 and S4 with respect to the direction perpendicular to the top surface of the substrate 1 is smaller than the angle θ2 formed by each of the first and second side surfaces S1 and S2 with respect to the direction perpendicular to the top surface of the substrate 1. Consequently, according to the present embodiment, in the neighborhood of the boundary between the track width defining portion 12A and the wide portion 12B, it is possible to increase the cross-sectional area of the pole layer 12 perpendicular to the direction in which magnetic flux flows. The present embodiment thus allows a magnetic flux of great magnitude to pass in the neighborhood of the boundary between the track width defining portion 12A and the wide portion 12B. As a result, it is possible to improve the write characteristics (overwrite property).

In the present embodiment, the top surface of the pole layer 12 includes: the first portion 12T1 having the first edge E1 located in the medium facing surface 30 and the second edge E2 opposite to the first edge E1; and the second portion 12T2 that is located farther from the medium facing surface 30 than is the first portion 12T1 and connected to the first portion 12T1 at the second edge E2. The distance from the top surface of the substrate 1 to an arbitrary point on the first portion 12T1 decreases with decreasing distance from the arbitrary point to the medium facing surface 30. According to the present embodiment, it is thus possible to suppress the occurrence of adjacent track erasing resulting from the skew and to guide a magnetic flux of great magnitude to the medium facing surface 30 through the pole layer 12. It is thereby possible to improve the write characteristics (overwrite property).

Furthermore, according to the method of manufacturing the magnetic head of the present embodiment, it is possible to position the top surfaces of the pole layer 12 and the side shield layer 13C at the same height. The present embodiment thus makes it possible to prevent the effect of the side shield layer 13C from varying from product to product.

The present invention is not limited to the foregoing embodiment but can be carried out in various modifications. For example, in the foregoing embodiment, the top surface of the pole layer 12 includes the first portion 12T1 and the second portion 12T2; however, the pole layer 12 may have a flat top surface extending in a direction substantially perpendicular to the medium facing surface 30.

While the foregoing embodiment has been described with reference to a magnetic head having a structure in which the read head is formed on the base body and the write head is stacked on the read head, the read head and the write head may be stacked in the reverse order.

It is apparent that the present invention can be carried out in various forms and modifications in the light of the foregoing descriptions. Accordingly, within the scope of the following claims and equivalents thereof, the present invention can be carried out in forms other than the foregoing most preferred embodiment.

What is claimed is:

1. A magnetic head for perpendicular magnetic recording comprising:
    a medium facing surface that faces toward a recording medium;
    a coil for generating a magnetic field corresponding to data to be written on the recording medium;
    a pole layer having an end face located in the medium facing surface, the pole layer allowing a magnetic flux corresponding to the magnetic field generated by the coil to pass and generating a write magnetic field for writing the data on the recording medium by means of a perpendicular magnetic recording system;
    a top shield layer formed of a magnetic material and having an end face located in the medium facing surface at a position forward of the end face of the pole layer along a direction of travel of the recording medium;
    a top gap layer formed of a nonmagnetic material and having an end face located in the medium facing surface, the top gap layer being disposed between the pole layer and the top shield layer;
    a side shield layer formed of a magnetic material, the side shield layer having a first end face located in the medium facing surface, a second end face opposite to the first end face, and a first groove accommodating a portion of the pole layer, the first end face including two portions located on both sides of the end face of the pole layer that are opposite to each other in a track width direction;
    a side gap layer formed of a nonmagnetic material and having an end face located in the medium facing surface, the side gap layer being disposed between the pole layer and the side shield layer;
    an encasing layer formed of a nonmagnetic material and disposed on a side of the side shield layer opposite to the medium facing surface, the encasing layer having a front end face touching the second end face of the side shield layer, and a second groove accommodating another portion of the pole layer; and
    a substrate on which the coil, the side shield layer, the side gap layer, the encasing layer, the pole layer, the top gap layer and the top shield layer are stacked, the substrate having a top surface, wherein:
    the pole layer is located closer to the top surface of the substrate than is the top shield layer; and
    a distance from the medium facing surface to an arbitrary point on the second end face of the side shield layer decreases with decreasing distance from the arbitrary point to the top surface of the substrate.

2. The magnetic head according to claim 1, wherein the end face of the pole layer located in the medium facing surface has a width that is taken in the track width direction and that decreases with decreasing distance from the top surface of the substrate.

3. The magnetic head according to claim 2, wherein:
    the portion of the pole layer accommodated in the first groove of the side shield layer has a first side surface and a second side surface that are opposite to each other in the track width direction;
    the portion of the pole layer accommodated in the second groove of the encasing layer has a third side surface and a fourth side surface that are opposite to each other in the track width direction;
    a distance between the first side surface and the second side surface taken in the track width direction decreases with decreasing distance from the top surface of the substrate;
    an angle formed by each of the third and fourth side surfaces with respect to a direction perpendicular to the top surface of the substrate is smaller than an angle formed by each of the first and second side surfaces with respect to the direction perpendicular to the top surface of the substrate.

4. The magnetic head according to claim 1, wherein: the pole layer has a top surface including a first portion and a second portion, the first portion having a first edge located in the medium facing surface and a second edge opposite to the first edge, the second portion being located farther from the medium facing surface than is the first portion and being connected to the first portion at the second edge; and a distance from the top surface of the substrate to an arbitrary point on the first portion decreases with decreasing distance from the arbitrary point to the medium facing surface.

5. A method of manufacturing a magnetic head for perpendicular magnetic recording, the magnetic head comprising:
   a medium facing surface that faces toward a recording medium;
   a coil for generating a magnetic field corresponding to data to be written on the recording medium;
   a pole layer having an end face located in the medium facing surface, the pole layer allowing a magnetic flux corresponding to the magnetic field generated by the coil to pass and generating a write magnetic field for writing the data on the recording medium by means of a perpendicular magnetic recording system;
   a top shield layer formed of a magnetic material and having an end face located in the medium facing surface at a position forward of the end face of the pole layer along a direction of travel of the recording medium;
   a top gap layer formed of a nonmagnetic material and having an end face located in the medium facing surface, the top gap layer being disposed between the pole layer and the top shield layer;
   a side shield layer formed of a magnetic material, the side shield layer having a first end face located in the medium facing surface, a second end face opposite to the first end face, and a first groove accommodating a portion of the pole layer, the first end face including two portions located on both sides of the end face of the pole layer that are opposite to each other in a track width direction;
   a side gap layer formed of a nonmagnetic material and having an end face located in the medium facing surface, the side gap layer being disposed between the pole layer and the side shield layer;
   an encasing layer formed of a nonmagnetic material and disposed on a side of the side shield layer opposite to the medium facing surface, the encasing layer having a front end face touching the second end face of the side shield layer, and a second groove accommodating another portion of the pole layer; and
   a substrate on which the coil, the side shield layer, the side gap layer, the encasing layer, the pole layer, the top gap layer and the top shield layer are stacked, the substrate having a top surface, wherein:
   the pole layer is located closer to the top surface of the substrate than is the top shield layer; and
   a distance from the medium facing surface to an arbitrary point on the second end face of the side shield layer decreases with decreasing distance from the arbitrary point to the top surface of the substrate,
   the method comprising the steps of:
   forming a nonmagnetic layer, the nonmagnetic layer being intended to become the encasing layer by undergoing formation of the front end face and the second groove therein later;
   forming an etching mask layer on a top surface of the nonmagnetic layer, the etching mask layer being intended to be used when the nonmagnetic layer is etched for forming the front end face of the encasing layer;
   forming the front end face in the nonmagnetic layer by selectively etching the nonmagnetic layer using the etching mask layer;
   forming the side shield layer;
   forming the second groove in the nonmagnetic layer by selectively etching the nonmagnetic layer and the etching mask layer so that the nonmagnetic layer becomes the encasing layer;
   forming the side gap layer in the first groove of the side shield layer;
   forming a magnetic layer after the formation of the side gap layer, the magnetic layer being intended to later become the pole layer and being formed to fill the first and second grooves and to have a top surface located higher than a top surface of each of the side shield layer and the etching mask layer;
   forming the pole layer by processing the magnetic layer;
   forming the top gap layer;
   forming the top shield layer; and
   forming the coil,
   wherein the step of forming the pole layer includes the step of polishing the magnetic layer so as to flatten the top surfaces of the magnetic layer, the side shield layer and the etching mask layer and to form at least the portion of the pole layer accommodated in the second groove of the encasing layer.

6. The method according to claim 5, wherein the end face of the pole layer located in the medium facing surface has a width that is taken in the track width direction and that decreases with decreasing distance from the top surface of the substrate.

7. The method according to claim 6, wherein:
   the portion of the pole layer accommodated in the first groove of the side shield layer has a first side surface and a second side surface that are opposite to each other in the track width direction;
   the portion of the pole layer accommodated in the second groove of the encasing layer has a third side surface and a fourth side surface that are opposite to each other in the track width direction;
   a distance between the first side surface and the second side surface taken in the track width direction decreases with decreasing distance from the top surface of the substrate; and
   an angle formed by each of the third and fourth side surfaces with respect to a direction perpendicular to the top surface of the substrate is smaller than an angle formed by each of the first and second side surfaces with respect to the direction perpendicular to the top surface of the substrate.

8. The method according to claim 5, wherein: the pole layer has a top surface including a first portion and a second portion, the first portion having a first edge located in the medium facing surface and a second edge opposite to the first edge, the second portion being located farther from the medium facing surface than is the first portion and being connected to the first portion at the second edge; and a distance from the top surface of the substrate to an arbitrary point on the first portion decreases with decreasing distance from the arbitrary point to the medium facing surface,
   the method further comprising the step of etching a portion of the magnetic layer so as to form the first portion of the top surface of the pole layer, the step of etching being performed between the step of polishing the magnetic layer and the step of forming the top gap layer.

* * * * *